(12) United States Patent
Robinson et al.

(10) Patent No.: US 11,728,709 B2
(45) Date of Patent: Aug. 15, 2023

(54) ENCODERLESS VECTOR CONTROL FOR VFD IN HYDRAULIC FRACTURING APPLICATIONS

(71) Applicant: U.S. Well Services, LLC, Houston, TX (US)

(72) Inventors: Lon Robinson, Houston, TX (US); Jared Oehring, Houston, TX (US); Brandon N. Hinderliter, Houston, TX (US)

(73) Assignee: U.S. Well Services, LLC, Houston, TX (US)

( * ) Notice: Subject to any disclaimer, the term of this patent is extended or adjusted under 35 U.S.C. 154(b) by 623 days.

(21) Appl. No.: 16/873,583

(22) Filed: May 12, 2020

(65) Prior Publication Data

US 2020/0362681 A1 Nov. 19, 2020

Related U.S. Application Data

(60) Provisional application No. 62/847,022, filed on May 13, 2019.

(51) Int. Cl.
*H02K 7/18* (2006.01)
*H02K 7/14* (2006.01)
(Continued)

(52) U.S. Cl.
CPC ............. *H02K 7/1823* (2013.01); *H02K 7/14* (2013.01); *H02K 11/33* (2016.01);
(Continued)

(58) Field of Classification Search
CPC .... E21B 43/2607; E21B 43/283; E21B 43/26; E21B 41/0092; H02K 7/1823;
(Continued)

(56) References Cited

U.S. PATENT DOCUMENTS

| | | |
|---|---|---|
| 1,541,601 A | 6/1925 | Tribe |
| 1,656,861 A | 1/1928 | Leonard |

(Continued)

FOREIGN PATENT DOCUMENTS

| | | |
|---|---|---|
| AU | 2011203353 | 7/2011 |
| CA | 2158637 | 9/1994 |

(Continued)

OTHER PUBLICATIONS

UK Power Networks—Transformers to Supply Heat to Tate Modern—from Press Releases May 16, 2013.

(Continued)

*Primary Examiner* — Alexander A Singh
(74) *Attorney, Agent, or Firm* — Hogan Lovells US LLP

(57) ABSTRACT

A system and a method for use of electric motors in fracturing operations are disclosed. The system includes an electric motor, a turbine generator, an encoderless vector control subsystem, and at least one pump. The turbine generator is adapted to generate electric power for the system. The encoderless vector control subsystem is coupled between the turbine generator and the electric motor to control the electric motor using determined parameters that are based in part on vibration induced in a feature associated with the turbine generator. The at least one pump is adapted to receive torque input from the electric motor.

18 Claims, 8 Drawing Sheets

(51) Int. Cl.
    *H02K 11/33*     (2016.01)
    *E21B 43/26*     (2006.01)
    *F04B 17/03*     (2006.01)
    *H02P 23/00*     (2016.01)
    *F01D 15/10*     (2006.01)
    *E21B 43/28*     (2006.01)
    *H02P 21/05*     (2006.01)

(52) U.S. Cl.
    CPC ......... *E21B 43/2607* (2020.05); *E21B 43/283* (2013.01); *F01D 15/10* (2013.01); *F04B 17/03* (2013.01); *F05D 2220/32* (2013.01); *F05D 2260/83* (2013.01); *H02P 21/05* (2013.01); *H02P 23/0004* (2013.01)

(58) Field of Classification Search
    CPC ........... H02K 7/14; H02K 11/33; F04B 15/02; F04B 23/06; F04B 17/03; H02P 23/0004; H02P 21/18; H02P 21/05; F01D 15/10; F01D 21/003; F05D 2260/83; F05D 2220/32; F05D 2270/334; F05D 2220/76
    See application file for complete search history.

(56) References Cited

U.S. PATENT DOCUMENTS

| | | |
|---|---|---|
| 1,671,436 A | 5/1928 | Melott |
| 1,743,771 A | 1/1930 | Hall |
| 1,967,466 A | 7/1934 | Damsel |
| 2,004,077 A | 6/1935 | McCartney |
| 2,183,364 A | 12/1939 | Bailey |
| 2,220,622 A | 11/1940 | Aitken |
| 2,244,106 A | 6/1941 | Granberg |
| 2,248,051 A | 7/1941 | Armstrong |
| 2,389,328 A | 11/1945 | Stilwell |
| 2,407,796 A | 9/1946 | Page |
| 2,416,848 A | 3/1947 | Rothery |
| 2,610,741 A | 9/1952 | Schmid |
| 2,753,940 A | 7/1956 | Bonner |
| 2,976,025 A | 3/1961 | Pro |
| 3,055,682 A | 9/1962 | Bacher |
| 3,061,039 A | 10/1962 | Peters |
| 3,066,503 A | 12/1962 | Fleming |
| 3,302,069 A | 1/1967 | Webster |
| 3,334,495 A | 8/1967 | Jensen |
| 3,347,570 A | 10/1967 | Roessler |
| 3,601,198 A | 8/1971 | Ahearn |
| 3,722,595 A | 3/1973 | Kiel |
| 3,764,233 A | 10/1973 | Strickland |
| 3,773,140 A | 11/1973 | Mahajan |
| 3,837,179 A | 9/1974 | Barth |
| 3,849,662 A | 11/1974 | Blaskowski |
| 3,878,884 A | 4/1975 | Raleigh |
| 3,881,551 A | 5/1975 | Terry |
| 3,967,841 A | 7/1976 | Kendrick |
| 3,978,877 A | 9/1976 | Cox |
| 4,037,431 A | 7/1977 | Sugimoto |
| 4,066,869 A | 1/1978 | Apaloo |
| 4,100,822 A | 7/1978 | Rosman |
| 4,151,575 A | 4/1979 | Hogue |
| 4,226,299 A | 10/1980 | Hansen |
| 4,265,266 A | 5/1981 | Kierbow et al. |
| 4,411,313 A | 10/1983 | Johnson et al. |
| 4,421,975 A | 12/1983 | Stein |
| 4,432,064 A | 2/1984 | Barker |
| 4,442,665 A | 4/1984 | Fick et al. |
| 4,456,092 A | 6/1984 | Kubozuka |
| 4,506,982 A | 3/1985 | Smithers et al. |
| 4,512,387 A | 4/1985 | Rodriguez |
| 4,529,887 A | 7/1985 | Johnson |
| 4,538,916 A | 9/1985 | Zimmerman |
| 4,601,629 A | 7/1986 | Zimmerman |
| 4,676,063 A | 6/1987 | Goebel et al. |
| 4,759,674 A | 7/1988 | Schroder |
| 4,768,884 A | 9/1988 | Elkin |
| 4,783,038 A | 11/1988 | Gilbert |
| 4,793,386 A | 12/1988 | Sloan |
| 4,845,981 A | 7/1989 | Pearson |
| 4,877,956 A | 10/1989 | Priest |
| 4,922,463 A | 5/1990 | Del Zotto et al. |
| 5,004,400 A | 4/1991 | Handke |
| 5,006,044 A | 4/1991 | Walker, Sr. |
| 5,025,861 A | 6/1991 | Huber et al. |
| 5,050,673 A | 9/1991 | Baldridge |
| 5,114,239 A | 5/1992 | Allen |
| 5,130,628 A | 7/1992 | Owen |
| 5,131,472 A | 7/1992 | Dees et al. |
| 5,134,328 A | 7/1992 | Johnatakis |
| 5,172,009 A | 12/1992 | Mohan |
| 5,189,388 A | 2/1993 | Mosley |
| 5,230,366 A | 7/1993 | Marandi |
| 5,293,947 A | 3/1994 | Stratton |
| 5,334,898 A | 8/1994 | Skybyk |
| 5,334,899 A | 8/1994 | Skybyk |
| 5,366,324 A | 11/1994 | Arlt |
| 5,422,550 A | 6/1995 | McClanahan |
| 5,433,243 A | 7/1995 | Griswold |
| 5,439,066 A | 8/1995 | Gipson |
| 5,486,047 A | 1/1996 | Zimmerman |
| 5,517,593 A | 5/1996 | Nenniger |
| 5,517,822 A | 5/1996 | Haws et al. |
| 5,548,093 A | 8/1996 | Sato |
| 5,549,285 A | 8/1996 | Collins |
| 5,590,976 A | 1/1997 | Kilheffer et al. |
| 5,606,853 A | 3/1997 | Birch |
| 5,655,361 A | 8/1997 | Kishi |
| 5,712,802 A | 1/1998 | Kumar |
| 5,736,838 A | 4/1998 | Dove et al. |
| 5,755,096 A | 5/1998 | Holleyman |
| 5,790,972 A | 8/1998 | Kohlenberger |
| 5,791,636 A | 8/1998 | Loziuk |
| 5,798,596 A | 8/1998 | Lordo |
| 5,813,455 A | 9/1998 | Pratt et al. |
| 5,865,247 A | 2/1999 | Paterson |
| 5,879,137 A | 3/1999 | Yie |
| 5,894,888 A | 4/1999 | Wiemers |
| 5,907,970 A | 6/1999 | Havlovick et al. |
| 5,950,726 A | 9/1999 | Roberts |
| 6,007,227 A | 12/1999 | Carlson |
| 6,035,265 A | 3/2000 | Dister et al. |
| 6,059,539 A | 5/2000 | Nyilas |
| 6,097,310 A | 8/2000 | Harrell et al. |
| 6,116,040 A | 9/2000 | Stark |
| 6,121,705 A | 9/2000 | Hoong |
| 6,138,764 A | 10/2000 | Scarsdale et al. |
| 6,142,878 A | 11/2000 | Barin |
| 6,164,910 A | 12/2000 | Mayleben |
| 6,167,965 B1 | 1/2001 | Bearden |
| 6,202,702 B1 | 3/2001 | Ohira |
| 6,208,098 B1 | 3/2001 | Kume |
| 6,254,462 B1 | 7/2001 | Kelton |
| 6,271,637 B1 | 8/2001 | Kushion |
| 6,273,193 B1 | 8/2001 | Hermann et al. |
| 6,315,523 B1 | 11/2001 | Mills |
| 6,321,860 B1 | 11/2001 | Reddoch |
| 6,406,011 B1 | 6/2002 | Kosar |
| 6,442,942 B1 | 9/2002 | Kopko |
| 6,477,852 B2 | 11/2002 | Dodo |
| 6,484,490 B1 | 11/2002 | Olsen |
| 6,491,098 B1 | 12/2002 | Dallas |
| 6,510,695 B1 | 1/2003 | Fisher |
| 6,529,135 B1 | 3/2003 | Bowers et al. |
| 6,585,455 B1 | 7/2003 | Petersen et al. |
| 6,626,646 B2 | 9/2003 | Rajewski |
| 6,719,900 B2 | 4/2004 | Hawkins |
| 6,765,304 B2 | 7/2004 | Baten et al. |
| 6,776,227 B2 | 8/2004 | Beida |
| 6,786,051 B2 | 9/2004 | Kristich |
| 6,788,022 B2 | 9/2004 | Sopko |
| 6,802,690 B2 | 10/2004 | Han |
| 6,808,303 B2 | 10/2004 | Fisher |
| 6,837,910 B1 | 1/2005 | Yoshikawa |
| 6,857,486 B2 | 2/2005 | Chitwood |

(56) References Cited

U.S. PATENT DOCUMENTS

| | | |
|---|---|---|
| 6,931,310 B2 | 8/2005 | Shimizu et al. |
| 6,936,947 B1 | 8/2005 | Leijon |
| 6,985,750 B1 | 1/2006 | Vicknair |
| 7,006,792 B2 | 2/2006 | Wilson |
| 7,011,152 B2 | 3/2006 | Soelvik |
| 7,082,993 B2 | 8/2006 | Ayoub |
| 7,104,233 B2 | 9/2006 | Ryczek et al. |
| 7,170,262 B2 | 1/2007 | Pettigrew |
| 7,173,399 B2 | 2/2007 | Sihler |
| 7,279,655 B2 | 10/2007 | Blutke |
| 7,308,933 B1 | 12/2007 | Mayfield |
| 7,309,835 B2 | 12/2007 | Morrison |
| 7,312,593 B1 | 12/2007 | Streicher et al. |
| 7,336,514 B2 | 2/2008 | Amarillas |
| 7,341,287 B2 | 3/2008 | Gibb |
| 7,445,041 B2 | 11/2008 | O'Brien |
| 7,494,263 B2 | 2/2009 | Dykstra et al. |
| 7,500,642 B2 | 3/2009 | Cunningham |
| 7,525,264 B2 | 4/2009 | Dodge |
| 7,563,076 B2 | 7/2009 | Brunet |
| 7,581,379 B2 | 9/2009 | Koshida |
| 7,660,648 B2 | 2/2010 | Dykstra |
| 7,675,189 B2 | 3/2010 | Grenier |
| 7,683,499 B2 | 3/2010 | Saucier |
| 7,717,193 B2 | 5/2010 | Egilsson et al. |
| 7,755,310 B2 | 7/2010 | West et al. |
| 7,770,396 B2 | 8/2010 | Roby |
| 7,795,830 B2 | 9/2010 | Johnson |
| 7,807,048 B2 | 10/2010 | Collette |
| 7,835,140 B2 | 11/2010 | Mori |
| 7,845,413 B2 | 12/2010 | Shampine et al. |
| 7,900,893 B2 | 3/2011 | Teurlay |
| 7,901,314 B2 | 3/2011 | Salvaire |
| 7,926,562 B2 | 4/2011 | Poitzsch |
| 7,940,039 B2 | 5/2011 | de Buda |
| 7,949,483 B2 | 5/2011 | Discenzo |
| 7,971,650 B2 | 7/2011 | Yuratich |
| 7,977,824 B2 | 7/2011 | Halen et al. |
| 7,984,757 B1 | 7/2011 | Keast |
| 8,037,936 B2 | 10/2011 | Neuroth |
| 8,054,084 B2 | 11/2011 | Schulz et al. |
| 8,069,710 B2 | 12/2011 | Dodd |
| 8,083,504 B2 | 12/2011 | Williams |
| 8,091,928 B2 | 1/2012 | Carrier |
| 8,096,354 B2 | 1/2012 | Poitzsch |
| 8,096,891 B2 | 1/2012 | Lochtefeld |
| 8,139,383 B2 | 3/2012 | Efraimsson |
| 8,146,665 B2 | 4/2012 | Neal |
| 8,154,419 B2 | 4/2012 | Daussin et al. |
| 8,174,853 B2 | 5/2012 | Kane |
| 8,221,513 B2 | 7/2012 | Ariyapadi |
| 8,232,892 B2 | 7/2012 | Overholt et al. |
| 8,261,528 B2 | 9/2012 | Chillar |
| 8,272,439 B2 | 9/2012 | Strickland |
| 8,310,272 B2 | 11/2012 | Quarto |
| 8,354,817 B2 | 1/2013 | Yeh et al. |
| 8,379,424 B2 | 2/2013 | Grbovic |
| 8,469,097 B2 | 6/2013 | Gray |
| 8,474,521 B2 | 7/2013 | Kajaria |
| RE44,444 E | 8/2013 | Dole |
| 8,503,180 B2 | 8/2013 | Nojima |
| 8,506,267 B2 | 8/2013 | Gambier |
| 8,534,235 B2 | 9/2013 | Chandler |
| 8,534,366 B2 | 9/2013 | Fielder |
| 8,556,302 B2 | 10/2013 | Dole |
| 8,573,303 B2 | 11/2013 | Kerfoot |
| 8,596,056 B2 | 12/2013 | Woodmansee |
| 8,616,005 B1 | 12/2013 | Cousino |
| 8,616,274 B2 | 12/2013 | Belcher et al. |
| 8,622,128 B2 | 1/2014 | Hegeman |
| 8,628,627 B2 | 1/2014 | Sales |
| 8,646,521 B2 | 2/2014 | Bowen |
| 8,692,408 B2 | 4/2014 | Zhang et al. |
| 8,727,068 B2 | 5/2014 | Bruin |
| 8,727,737 B2 | 5/2014 | Seitter |
| 8,727,783 B2 | 5/2014 | Chen |
| 8,760,657 B2 | 6/2014 | Pope |
| 8,763,387 B2 | 7/2014 | Schmidt |
| 8,774,972 B2 | 7/2014 | Rusnak et al. |
| 8,789,601 B2 | 7/2014 | Broussard |
| 8,789,609 B2 | 7/2014 | Smith |
| 8,795,525 B2 | 8/2014 | McGinnis et al. |
| 8,800,652 B2 | 8/2014 | Bartko |
| 8,807,960 B2 | 8/2014 | Stephenson |
| 8,838,341 B2 | 9/2014 | Kumano |
| 8,851,860 B1 | 10/2014 | Mail |
| 8,857,506 B2 | 10/2014 | Stone, Jr. |
| 8,874,383 B2 | 10/2014 | Gambier |
| 8,899,940 B2 | 12/2014 | Laugemors |
| 8,905,056 B2 | 12/2014 | Kendrick |
| 8,905,138 B2 | 12/2014 | Lundstedt et al. |
| 8,997,904 B2 | 4/2015 | Cryer |
| 9,018,881 B2 | 4/2015 | Mao et al. |
| 9,051,822 B2 | 6/2015 | Ayan |
| 9,051,923 B2 | 6/2015 | Kuo |
| 9,061,223 B2 | 6/2015 | Winborn |
| 9,062,545 B2 | 6/2015 | Roberts et al. |
| 9,067,182 B2 | 6/2015 | Nichols |
| 9,080,412 B2 | 7/2015 | Wetzel |
| 9,103,193 B2 | 8/2015 | Coli |
| 9,119,326 B2 | 8/2015 | McDonnell |
| 9,121,257 B2 | 9/2015 | Coli et al. |
| 9,140,105 B2 | 9/2015 | Pattillo |
| 9,140,110 B2 | 9/2015 | Coli et al. |
| 9,160,168 B2 | 10/2015 | Chapel |
| 9,260,253 B2 | 2/2016 | Naizer |
| 9,322,239 B2 | 4/2016 | Angeles Boza et al. |
| 9,324,049 B2 | 4/2016 | Thomeer |
| 9,340,353 B2 | 5/2016 | Oren |
| 9,353,593 B1 | 5/2016 | Lu et al. |
| 9,366,114 B2 | 6/2016 | Coli et al. |
| 9,410,410 B2 | 8/2016 | Broussard et al. |
| 9,450,385 B2 | 9/2016 | Kristensen |
| 9,475,020 B2 | 10/2016 | Coli et al. |
| 9,475,021 B2 | 10/2016 | Coli et al. |
| 9,482,086 B2 | 11/2016 | Richardson et al. |
| 9,499,335 B2 | 11/2016 | McIver |
| 9,506,333 B2 | 11/2016 | Castillo et al. |
| 9,513,055 B1 | 12/2016 | Seal |
| 9,534,473 B2 | 1/2017 | Morris et al. |
| 9,562,420 B2 | 2/2017 | Morris et al. |
| 9,587,649 B2 | 3/2017 | Oehring |
| 9,611,728 B2 | 4/2017 | Oehring |
| 9,650,871 B2 | 5/2017 | Oehring et al. |
| 9,650,879 B2 | 5/2017 | Broussard et al. |
| 9,706,185 B2 | 7/2017 | Ellis |
| 9,728,354 B2 | 8/2017 | Skolozdra |
| 9,738,461 B2 | 8/2017 | DeGaray |
| 9,739,546 B2 | 8/2017 | Bertilsson et al. |
| 9,745,840 B2 | 8/2017 | Oehring et al. |
| 9,790,858 B2 | 10/2017 | Kanebako |
| 9,822,631 B2 | 11/2017 | Ravi |
| 9,840,897 B2 | 12/2017 | Larson |
| 9,840,901 B2 | 12/2017 | Oehring et al. |
| 9,841,026 B2 | 12/2017 | Stinessen |
| 9,863,228 B2 | 1/2018 | Shampine et al. |
| RE46,725 E | 2/2018 | Case |
| 9,893,500 B2 | 2/2018 | Oehring |
| 9,903,190 B2 | 2/2018 | Conrad |
| 9,909,398 B2 | 3/2018 | Pham |
| 9,915,128 B2 | 3/2018 | Hunter |
| 9,932,799 B2 | 4/2018 | Symchuk |
| 9,945,365 B2 | 4/2018 | Hernandez et al. |
| 9,963,961 B2 | 5/2018 | Hardin |
| 9,970,278 B2 | 5/2018 | Broussard |
| 9,976,351 B2 | 5/2018 | Randall |
| 9,995,218 B2 | 6/2018 | Oehring |
| 10,008,880 B2 | 6/2018 | Vicknair |
| 10,020,711 B2 | 7/2018 | Oehring |
| 10,036,238 B2 | 7/2018 | Oehring |
| 10,107,086 B2 | 10/2018 | Oehring |
| 10,119,381 B2 | 11/2018 | Oehring |
| 10,167,863 B1 | 1/2019 | Cook |
| 10,184,465 B2 | 1/2019 | Enis et al. |

(56) References Cited

U.S. PATENT DOCUMENTS

| | | |
|---|---|---|
| 10,196,878 B2 | 2/2019 | Hunter |
| 10,221,639 B2 | 3/2019 | Romer et al. |
| 10,227,854 B2 | 3/2019 | Glass |
| 10,232,332 B2 | 3/2019 | Oehring |
| 10,246,984 B2 | 4/2019 | Payne |
| 10,254,732 B2 | 4/2019 | Oehring |
| 10,260,327 B2 | 4/2019 | Kajaria |
| 10,280,724 B2 | 5/2019 | Hinderliter |
| 10,287,873 B2 | 5/2019 | Filas |
| 10,302,079 B2 | 5/2019 | Kendrick |
| 10,309,205 B2 | 6/2019 | Randall |
| 10,337,308 B2 | 7/2019 | Broussard |
| 10,371,012 B2 | 8/2019 | Davis |
| 10,378,326 B2 | 8/2019 | Morris |
| 10,393,108 B2 | 8/2019 | Chong |
| 10,407,990 B2 | 9/2019 | Oehring |
| 10,408,030 B2 | 9/2019 | Oehring et al. |
| 10,408,031 B2 | 9/2019 | Oehring et al. |
| 10,415,332 B2 | 9/2019 | Morris et al. |
| 10,436,026 B2 | 10/2019 | Ounadjela |
| 10,443,660 B2 | 10/2019 | Harris |
| 10,526,882 B2 | 1/2020 | Oehring |
| 10,627,003 B2 | 4/2020 | Dale et al. |
| 10,648,270 B2 | 5/2020 | Brunty et al. |
| 10,648,311 B2 | 5/2020 | Oehring et al. |
| 10,669,471 B2 | 6/2020 | Schmidt et al. |
| 10,669,804 B2 | 6/2020 | Kotrla |
| 10,686,301 B2 | 6/2020 | Oehring et al. |
| 10,690,131 B2 | 6/2020 | Rashid |
| 10,695,950 B2 | 6/2020 | Igo et al. |
| 10,711,576 B2 | 7/2020 | Bishop |
| 10,731,561 B2 | 8/2020 | Oehring et al. |
| 10,740,730 B2 | 8/2020 | Altamirano et al. |
| 10,767,561 B2 | 9/2020 | Brady |
| 10,781,752 B2 | 9/2020 | Kikkawa et al. |
| 10,794,165 B2 | 10/2020 | Fischer et al. |
| 10,934,824 B2 | 3/2021 | Oehring |
| 10,988,998 B2 | 4/2021 | Fischer et al. |
| 11,091,992 B2 | 8/2021 | Broussard |
| 2001/0000996 A1 | 5/2001 | Grimland et al. |
| 2002/0169523 A1 | 11/2002 | Ross et al. |
| 2003/0079875 A1 | 1/2003 | Weng |
| 2003/0056514 A1 | 3/2003 | Lohn |
| 2003/0057704 A1 | 3/2003 | Baten |
| 2003/0138327 A1 | 7/2003 | Jones et al. |
| 2004/0040746 A1 | 3/2004 | Niedermayr et al. |
| 2004/0045703 A1 | 3/2004 | Hooper et al. |
| 2004/0102109 A1 | 5/2004 | Cratty et al. |
| 2004/0167738 A1 | 8/2004 | Miller |
| 2005/0061548 A1 | 3/2005 | Hooper |
| 2005/0116541 A1 | 6/2005 | Seiver |
| 2005/0201197 A1 | 9/2005 | Duell et al. |
| 2005/0274508 A1 | 12/2005 | Folk |
| 2006/0052903 A1 | 3/2006 | Bassett |
| 2006/0065319 A1 | 3/2006 | Csitari |
| 2006/0109141 A1 | 5/2006 | Huang |
| 2007/0125544 A1 | 6/2007 | Robinson |
| 2007/0131410 A1 | 6/2007 | Hill |
| 2007/0151731 A1 | 7/2007 | Butler |
| 2007/0187163 A1 | 8/2007 | Cone |
| 2007/0201305 A1 | 8/2007 | Heilman et al. |
| 2007/0204991 A1 | 9/2007 | Loree |
| 2007/0226089 A1 | 9/2007 | DeGaray et al. |
| 2007/0277982 A1 | 12/2007 | Shampine |
| 2007/0278140 A1 | 12/2007 | Mallet et al. |
| 2008/0017369 A1 | 1/2008 | Sarada |
| 2008/0041596 A1 | 2/2008 | Blount |
| 2008/0066911 A1 | 3/2008 | Luharuka |
| 2008/0095644 A1 | 4/2008 | Mantei et al. |
| 2008/0112802 A1 | 5/2008 | Orlando |
| 2008/0137266 A1 | 6/2008 | Jensen |
| 2008/0164023 A1 | 7/2008 | Dykstra et al. |
| 2008/0187444 A1 | 8/2008 | Molotkov |
| 2008/0208478 A1 | 8/2008 | Ella et al. |
| 2008/0217024 A1 | 9/2008 | Moore |
| 2008/0236818 A1 | 10/2008 | Dykstra |
| 2008/0257449 A1 | 10/2008 | Weinstein et al. |
| 2008/0264625 A1 | 10/2008 | Ochoa |
| 2008/0264649 A1 | 10/2008 | Crawford |
| 2008/0277120 A1 | 11/2008 | Hickie |
| 2008/0288115 A1 | 11/2008 | Rusnak |
| 2008/0303469 A1 | 12/2008 | Nojima |
| 2009/0045782 A1 | 2/2009 | Datta |
| 2009/0065299 A1 | 3/2009 | Vito |
| 2009/0068031 A1 | 3/2009 | Gambier |
| 2009/0068301 A1 | 3/2009 | Gambier |
| 2009/0072645 A1 | 3/2009 | Quere |
| 2009/0078410 A1 | 3/2009 | Krenek et al. |
| 2009/0093317 A1 | 4/2009 | Kajiwara et al. |
| 2009/0095482 A1 | 4/2009 | Suijaatmadja |
| 2009/0101410 A1 | 4/2009 | Egilsson |
| 2009/0114392 A1 | 5/2009 | Tolman |
| 2009/0145611 A1 | 6/2009 | Pallini, Jr. |
| 2009/0153354 A1 | 6/2009 | Daussin et al. |
| 2009/0188181 A1 | 7/2009 | Forbis |
| 2009/0194273 A1 | 8/2009 | Surjaatmadja |
| 2009/0200035 A1 | 8/2009 | Bjerkreim et al. |
| 2009/0260826 A1 | 10/2009 | Sherwood |
| 2009/0308602 A1 | 12/2009 | Bruins et al. |
| 2009/0315297 A1 | 12/2009 | Nadeau |
| 2010/0000508 A1 | 1/2010 | Chandler |
| 2010/0019574 A1 | 1/2010 | Baldassarre et al. |
| 2010/0038077 A1 | 2/2010 | Heilman |
| 2010/0038907 A1 | 2/2010 | Hunt |
| 2010/0045109 A1 | 2/2010 | Arnold |
| 2010/0051272 A1 | 3/2010 | Loree et al. |
| 2010/0132949 A1 | 6/2010 | DeFosse et al. |
| 2010/0146981 A1 | 6/2010 | Motakef |
| 2010/0172202 A1 | 7/2010 | Borgstadt |
| 2010/0193057 A1 | 8/2010 | Garner |
| 2010/0250139 A1 | 9/2010 | Hobbs et al. |
| 2010/0281876 A1 | 11/2010 | Khan |
| 2010/0293973 A1 | 11/2010 | Erickson |
| 2010/0300683 A1 | 12/2010 | Looper |
| 2010/0303655 A1 | 12/2010 | Scekic |
| 2010/0310384 A1 | 12/2010 | Stephenson |
| 2010/0322802 A1 | 12/2010 | Kugelev |
| 2011/0005757 A1 | 1/2011 | Hebert |
| 2011/0017468 A1 | 1/2011 | Birch et al. |
| 2011/0052423 A1 | 3/2011 | Gambier |
| 2011/0061855 A1 | 3/2011 | Case et al. |
| 2011/0079302 A1 | 4/2011 | Hawes |
| 2011/0081268 A1 | 4/2011 | Ochoa et al. |
| 2011/0085924 A1 | 4/2011 | Shampine |
| 2011/0110793 A1 | 5/2011 | Leugemors et al. |
| 2011/0166046 A1 | 7/2011 | Weaver |
| 2011/0175397 A1 | 7/2011 | Amrine |
| 2011/0194256 A1 | 8/2011 | De Rijck |
| 2011/0197988 A1 | 8/2011 | Van Vliet |
| 2011/0241590 A1 | 10/2011 | Horikoshi |
| 2011/0247831 A1 | 10/2011 | Smith |
| 2011/0247878 A1 | 10/2011 | Rasheed |
| 2011/0272158 A1 | 11/2011 | Neal |
| 2012/0018016 A1 | 1/2012 | Gibson |
| 2012/0049625 A1 | 3/2012 | Hopwood |
| 2012/0063936 A1 | 3/2012 | Baxter et al. |
| 2012/0067582 A1 | 3/2012 | Fincher |
| 2012/0085541 A1 | 4/2012 | Love et al. |
| 2012/0112757 A1 | 5/2012 | Vrankovic et al. |
| 2012/0127635 A1 | 5/2012 | Grindeland |
| 2012/0150455 A1 | 6/2012 | Franklin et al. |
| 2012/0152549 A1 | 6/2012 | Koroteev |
| 2012/0152716 A1 | 6/2012 | Kikukawa et al. |
| 2012/0205112 A1 | 8/2012 | Pettigrew |
| 2012/0205119 A1 | 8/2012 | Wentworth |
| 2012/0205301 A1 | 8/2012 | McGuire et al. |
| 2012/0205400 A1 | 8/2012 | DeGaray et al. |
| 2012/0222865 A1 | 9/2012 | Larson |
| 2012/0232728 A1 | 9/2012 | Karimi et al. |
| 2012/0247783 A1 | 10/2012 | Berner, Jr. |
| 2012/0255734 A1 | 10/2012 | Coli et al. |
| 2013/0009469 A1 | 1/2013 | Gillett |
| 2013/0025706 A1 | 1/2013 | DeGaray et al. |
| 2013/0051971 A1 | 2/2013 | Wyse et al. |

(56) References Cited

U.S. PATENT DOCUMENTS

| | | |
|---|---|---|
| 2013/0064528 A1 | 3/2013 | Bigex |
| 2013/0078114 A1 | 3/2013 | Van Rijswick |
| 2013/0138254 A1 | 5/2013 | Seals |
| 2013/0175038 A1 | 7/2013 | Conrad |
| 2013/0175039 A1 | 7/2013 | Guidry |
| 2013/0180722 A1 | 7/2013 | Olarte Caro |
| 2013/0189629 A1 | 7/2013 | Chandler |
| 2013/0199617 A1 | 8/2013 | DeGaray et al. |
| 2013/0233542 A1 | 9/2013 | Shampine |
| 2013/0242688 A1 | 9/2013 | Kageler |
| 2013/0255271 A1 | 10/2013 | Yu et al. |
| 2013/0278183 A1 | 10/2013 | Liang |
| 2013/0284278 A1 | 10/2013 | Winborn |
| 2013/0284455 A1 | 10/2013 | Kajaria et al. |
| 2013/0299167 A1 | 11/2013 | Fordyce |
| 2013/0306322 A1 | 11/2013 | Sanborn et al. |
| 2013/0317750 A1 | 11/2013 | Hunter |
| 2013/0341029 A1 | 12/2013 | Roberts et al. |
| 2013/0343858 A1 | 12/2013 | Flusche |
| 2014/0000899 A1 | 1/2014 | Nevison |
| 2014/0010671 A1 | 1/2014 | Cryer et al. |
| 2014/0041730 A1 | 2/2014 | Naizer |
| 2014/0054965 A1 | 2/2014 | Jain |
| 2014/0060658 A1 | 3/2014 | Hains |
| 2014/0077607 A1 | 3/2014 | Clarke |
| 2014/0095114 A1 | 4/2014 | Thomeer |
| 2014/0096974 A1 | 4/2014 | Coli |
| 2014/0124162 A1 | 5/2014 | Leavitt |
| 2014/0127036 A1 | 5/2014 | Buckley |
| 2014/0138079 A1 | 5/2014 | Broussard et al. |
| 2014/0147310 A1 | 5/2014 | Hunt |
| 2014/0174717 A1 | 6/2014 | Broussard et al. |
| 2014/0205475 A1 | 7/2014 | Dale |
| 2014/0219824 A1 | 8/2014 | Burnette |
| 2014/0238683 A1 | 8/2014 | Korach |
| 2014/0246211 A1 | 9/2014 | Guidry et al. |
| 2014/0251623 A1 | 9/2014 | Lestz et al. |
| 2014/0255214 A1 | 9/2014 | Burnette |
| 2014/0277772 A1 | 9/2014 | Lopez |
| 2014/0290768 A1 | 10/2014 | Randle |
| 2014/0294603 A1 | 10/2014 | Best |
| 2014/0332199 A1 | 11/2014 | Gilstad |
| 2014/0379300 A1 | 12/2014 | Devine |
| 2015/0027712 A1 | 1/2015 | Vicknair |
| 2015/0053426 A1 | 2/2015 | Smith |
| 2015/0068724 A1 | 3/2015 | Coli et al. |
| 2015/0068754 A1 | 3/2015 | Coli et al. |
| 2015/0075778 A1 | 3/2015 | Walters |
| 2015/0078924 A1 | 3/2015 | Zhang |
| 2015/0083426 A1 | 3/2015 | Lesko |
| 2015/0097504 A1 | 4/2015 | Lamascus |
| 2015/0114652 A1 | 4/2015 | Lestz |
| 2015/0136043 A1 | 5/2015 | Shaaban |
| 2015/0144336 A1 | 5/2015 | Hardin et al. |
| 2015/0147194 A1 | 5/2015 | Foote |
| 2015/0159911 A1 | 6/2015 | Holt |
| 2015/0175013 A1 | 6/2015 | Cryer et al. |
| 2015/0176386 A1 | 6/2015 | Castillo et al. |
| 2015/0211512 A1 | 7/2015 | Wiegman |
| 2015/0211524 A1 | 7/2015 | Broussard |
| 2015/0217672 A1 | 8/2015 | Shampine |
| 2015/0225113 A1 | 8/2015 | Lungu |
| 2015/0233530 A1 | 8/2015 | Sandidge |
| 2015/0252661 A1 | 9/2015 | Glass |
| 2015/0300145 A1 | 10/2015 | Coli et al. |
| 2015/0300336 A1 | 10/2015 | Hernandez |
| 2015/0314225 A1 | 11/2015 | Coli et al. |
| 2015/0330172 A1 | 11/2015 | Allmaras |
| 2015/0354322 A1 | 12/2015 | Vicknair |
| 2016/0006311 A1 | 1/2016 | Li |
| 2016/0032703 A1 | 2/2016 | Broussard et al. |
| 2016/0102537 A1 | 4/2016 | Lopez |
| 2016/0105022 A1 | 4/2016 | Oehring |
| 2016/0208592 A1 | 4/2016 | Oehring |
| 2016/0160889 A1 | 6/2016 | Hoffman et al. |
| 2016/0177675 A1 | 6/2016 | Morris et al. |
| 2016/0177678 A1 | 6/2016 | Morris |
| 2016/0186531 A1 | 6/2016 | Harkless et al. |
| 2016/0208593 A1 | 7/2016 | Coli et al. |
| 2016/0208594 A1 | 7/2016 | Coli et al. |
| 2016/0208595 A1 | 7/2016 | Tang |
| 2016/0221220 A1 | 8/2016 | Paige |
| 2016/0230524 A1 | 8/2016 | Dumoit |
| 2016/0230525 A1 | 8/2016 | Lestz et al. |
| 2016/0230660 A1 | 8/2016 | Zeitoun et al. |
| 2016/0258267 A1* | 9/2016 | Payne ............... E21B 43/26 |
| 2016/0265457 A1 | 9/2016 | Stephenson |
| 2016/0273328 A1 | 9/2016 | Oehring |
| 2016/0273456 A1 | 9/2016 | Zhang et al. |
| 2016/0281484 A1 | 9/2016 | Lestz |
| 2016/0290114 A1 | 10/2016 | Oehring |
| 2016/0290563 A1 | 10/2016 | Diggins |
| 2016/0312108 A1 | 10/2016 | Lestz et al. |
| 2016/0319650 A1 | 11/2016 | Oehring |
| 2016/0326853 A1 | 11/2016 | Fred et al. |
| 2016/0326854 A1 | 11/2016 | Broussard |
| 2016/0326855 A1 | 11/2016 | Coli et al. |
| 2016/0341281 A1 | 11/2016 | Brunvold et al. |
| 2016/0348479 A1 | 12/2016 | Oehring |
| 2016/0349728 A1 | 12/2016 | Oehring |
| 2016/0369609 A1 | 12/2016 | Morris et al. |
| 2017/0016433 A1 | 1/2017 | Chong |
| 2017/0021318 A1 | 1/2017 | McIver et al. |
| 2017/0022788 A1 | 1/2017 | Oehring et al. |
| 2017/0022807 A1 | 1/2017 | Dursun |
| 2017/0028368 A1 | 2/2017 | Oehring et al. |
| 2017/0030177 A1 | 2/2017 | Oehring et al. |
| 2017/0030178 A1 | 2/2017 | Oehring et al. |
| 2017/0036178 A1 | 2/2017 | Coli et al. |
| 2017/0036872 A1 | 2/2017 | Wallace |
| 2017/0037717 A1 | 2/2017 | Oehring |
| 2017/0037718 A1 | 2/2017 | Coli et al. |
| 2017/0043280 A1 | 2/2017 | Vankouwenberg |
| 2017/0051732 A1 | 2/2017 | Hemandez et al. |
| 2017/0074076 A1 | 3/2017 | Joseph et al. |
| 2017/0082033 A1 | 3/2017 | Wu et al. |
| 2017/0096885 A1 | 4/2017 | Oehring |
| 2017/0096889 A1 | 4/2017 | Blanckaert et al. |
| 2017/0104389 A1 | 4/2017 | Morris et al. |
| 2017/0114625 A1 | 4/2017 | Norris |
| 2017/0130743 A1 | 5/2017 | Anderson |
| 2017/0138171 A1 | 5/2017 | Richards et al. |
| 2017/0145918 A1 | 5/2017 | Oehring |
| 2017/0146189 A1 | 5/2017 | Herman |
| 2017/0159570 A1 | 6/2017 | Bickert |
| 2017/0159654 A1 | 6/2017 | Kendrick |
| 2017/0175516 A1 | 6/2017 | Eslinger |
| 2017/0204852 A1 | 7/2017 | Barnett |
| 2017/0212535 A1 | 7/2017 | Shelman et al. |
| 2017/0218727 A1 | 8/2017 | Oehring |
| 2017/0218843 A1 | 8/2017 | Oehring |
| 2017/0222409 A1 | 8/2017 | Oehring |
| 2017/0226838 A1 | 8/2017 | Ceizobka |
| 2017/0226839 A1 | 8/2017 | Broussard |
| 2017/0226842 A1 | 8/2017 | Omont et al. |
| 2017/0234250 A1 | 8/2017 | Janik |
| 2017/0241221 A1 | 8/2017 | Seshadri |
| 2017/0259227 A1 | 9/2017 | Morris et al. |
| 2017/0292513 A1 | 10/2017 | Haddad |
| 2017/0313499 A1 | 11/2017 | Hughes et al. |
| 2017/0314380 A1 | 11/2017 | Oehring |
| 2017/0314979 A1 | 11/2017 | Ye |
| 2017/0328179 A1 | 11/2017 | Dykstra |
| 2017/0369258 A1 | 12/2017 | DeGaray |
| 2017/0370639 A1 | 12/2017 | Barden et al. |
| 2018/0028992 A1 | 2/2018 | Stegemoeller |
| 2018/0038216 A1 | 2/2018 | Zhang |
| 2018/0045331 A1 | 2/2018 | Lopez |
| 2018/0090914 A1 | 3/2018 | Johnson et al. |
| 2018/0156210 A1 | 6/2018 | Oehring |
| 2018/0181830 A1 | 6/2018 | Laharuka et al. |
| 2018/0183219 A1 | 6/2018 | Oehring |
| 2018/0216455 A1 | 8/2018 | Andreychuk |
| 2018/0238147 A1 | 8/2018 | Shahri |

(56) References Cited

U.S. PATENT DOCUMENTS

| | | | |
|---|---|---|---|
| 2018/0245428 A1 | 8/2018 | Richards | |
| 2018/0245568 A1* | 8/2018 | Pedersen | F03D 7/0244 |
| 2018/0258746 A1 | 9/2018 | Broussard | |
| 2018/0259080 A1 | 9/2018 | Dale et al. | |
| 2018/0266217 A1 | 9/2018 | Funkhauser et al. | |
| 2018/0266412 A1 | 9/2018 | Stokkevag | |
| 2018/0274446 A1 | 9/2018 | Oehring | |
| 2018/0284817 A1 | 10/2018 | Cook et al. | |
| 2018/0291713 A1 | 10/2018 | Jeanson | |
| 2018/0298731 A1 | 10/2018 | Bishop | |
| 2018/0312738 A1 | 11/2018 | Rutsch et al. | |
| 2018/0313677 A1 | 11/2018 | Warren et al. | |
| 2018/0320483 A1 | 11/2018 | Zhang | |
| 2018/0343125 A1 | 11/2018 | Clish | |
| 2018/0363437 A1 | 12/2018 | Coli | |
| 2018/0363640 A1 | 12/2018 | Kajita et al. | |
| 2018/0366950 A1 | 12/2018 | Pedersen et al. | |
| 2019/0003329 A1 | 1/2019 | Morris | |
| 2019/0010793 A1 | 1/2019 | Hinderliter | |
| 2019/0040727 A1 | 2/2019 | Oehring et al. | |
| 2019/0055827 A1 | 2/2019 | Coli | |
| 2019/0063309 A1 | 2/2019 | Davis | |
| 2019/0100989 A1 | 4/2019 | Stewart | |
| 2019/0112910 A1 | 4/2019 | Oehring | |
| 2019/0119096 A1 | 4/2019 | Haile | |
| 2019/0120024 A1 | 4/2019 | Oehring | |
| 2019/0128080 A1 | 5/2019 | Ross | |
| 2019/0128104 A1 | 5/2019 | Graham et al. | |
| 2019/0145251 A1 | 5/2019 | Johnson | |
| 2019/0154020 A1 | 5/2019 | Glass | |
| 2019/0162061 A1 | 5/2019 | Stepheson | |
| 2019/0169971 A1 | 6/2019 | Oehring | |
| 2019/0178057 A1 | 6/2019 | Hunter | |
| 2019/0178235 A1 | 6/2019 | Coskrey | |
| 2019/0203567 A1 | 7/2019 | Ross | |
| 2019/0203572 A1 | 7/2019 | Morris | |
| 2019/0211661 A1 | 7/2019 | Reckels | |
| 2019/0226317 A1 | 7/2019 | Payne et al. | |
| 2019/0245348 A1 | 8/2019 | Hinderliter | |
| 2019/0249527 A1 | 8/2019 | Kraynek | |
| 2019/0257462 A1 | 8/2019 | Rogers | |
| 2019/0292866 A1 | 9/2019 | Ross | |
| 2019/0292891 A1 | 9/2019 | Kajaria | |
| 2020/0040878 A1 | 2/2020 | Morris | |
| 2020/0047141 A1 | 2/2020 | Oehring et al. | |
| 2020/0088152 A1 | 3/2020 | Allion et al. | |
| 2020/0194976 A1 | 6/2020 | Benussi | |
| 2020/0232454 A1 | 7/2020 | Chretien | |
| 2020/0325760 A1 | 10/2020 | Markham | |
| 2020/0350790 A1 | 11/2020 | Luft et al. | |

FOREIGN PATENT DOCUMENTS

| | | |
|---|---|---|
| CA | 2406801 | 11/2001 |
| CA | 2653069 | 12/2007 |
| CA | 2707269 | 12/2010 |
| CA | 2482943 | 5/2011 |
| CA | 3050131 | 11/2011 |
| CA | 2773843 | 10/2012 |
| CA | 2845347 | 10/2012 |
| CA | 2955706 | 10/2012 |
| CA | 2966672 | 10/2012 |
| CA | 3000322 | 4/2013 |
| CA | 2787814 | 2/2014 |
| CA | 2833711 | 5/2014 |
| CA | 2978706 | 9/2016 |
| CA | 2944980 | 2/2017 |
| CA | 3006422 | 6/2017 |
| CA | 3018485 | 8/2017 |
| CA | 2964593 | 10/2017 |
| CA | 2849825 | 7/2018 |
| CA | 3067854 A1 | 1/2019 |
| CA | 2919649 | 2/2019 |
| CA | 2919666 | 7/2019 |
| CA | 2797081 | 9/2019 |
| CA | 2945579 | 10/2019 |
| CN | 101639059 | 2/2010 |
| CN | 101977016 | 2/2011 |
| CN | 201730812 | 2/2011 |
| CN | 201819992 | 5/2011 |
| CN | 201925157 | 8/2011 |
| CN | 202157824 | 3/2012 |
| CN | 202406331 | 8/2012 |
| CN | 202463670 | 10/2012 |
| CN | 202500735 | 10/2012 |
| CN | 202545207 | 11/2012 |
| CN | 103095209 | 5/2013 |
| CN | 104117308 A | 10/2014 |
| CN | 102758604 | 12/2014 |
| CN | 104196613 A | 12/2014 |
| CN | 205986303 U | 2/2017 |
| CN | 108049999 A | 5/2018 |
| CN | 112196508 A | 1/2021 |
| EP | 3453827 | 3/2019 |
| EP | 3456915 | 3/2019 |
| JP | 2004264589 | 9/2004 |
| JP | 3626363 | 3/2005 |
| JP | 2008263774 | 10/2008 |
| JP | 2012-117371 | 6/2012 |
| KR | 20100028462 | 3/2010 |
| RU | 48205 | 9/2005 |
| RU | 98493 | 10/2010 |
| RU | 2421605 | 6/2011 |
| WO | 93/20328 | 10/1993 |
| WO | 98/53182 | 11/1998 |
| WO | 00/47893 | 8/2000 |
| WO | 2008/136883 | 11/2008 |
| WO | 2009/023042 | 2/2009 |
| WO | 2009046280 | 4/2009 |
| WO | 2011/127305 | 10/2011 |
| WO | 2012/051705 | 4/2012 |
| WO | 2012/122636 | 9/2012 |
| WO | 2012/137068 | 10/2012 |
| WO | 2014/116761 | 7/2014 |
| WO | 2014/177346 | 11/2014 |
| WO | 2014177346 | 11/2014 |
| WO | 2016/144939 | 9/2016 |
| WO | 2016/160458 | 10/2016 |
| WO | 2018044307 A1 | 3/2018 |
| WO | 2018213925 A1 | 11/2018 |
| WO | 2019210417 | 11/2019 |

OTHER PUBLICATIONS

Non-Final Office Action issued in corresponding U.S. Appl. No. 15/293,681 dated Feb. 16, 2017.

Non-Final Office Action issued in corresponding U.S. Appl. No. 15/294,349 dated Mar. 14, 2017.

Final Office Action issued in corresponding U.S. Appl. No. 15/145,491 dated Jan. 20, 2017.

Non-Final Office Action issued in corresponding U.S. Appl. No. 15/145,443 dated Feb. 7, 2017.

Notice of Allowance issued in corresponding U.S. Appl. No. 15/217,040 dated Mar. 28, 2017.

Notice of Allowance issued in corresponding U.S. Appl. No. 14/622,532 dated Mar. 27, 2017.

Non-Final Office Action issued in corresponding U.S. Appl. No. 15/291,842 dated Jan. 6, 2017.

Final Office Action issued in corresponding U.S. Appl. No. 14/622,532 dated Dec. 7, 2016.

Non-Final Office Action issued in corresponding U.S. Appl. No. 14/622,532 dated May 17, 2016.

Final Office Action issued in corresponding U.S. Appl. No. 14/622,532 dated Dec. 21, 2015.

Non-Final Office Action issued in corresponding U.S. Appl. No. 14/622,532 dated Aug. 5, 2015.

Non-Final Office Action issued in corresponding U.S. Appl. No. 15/145,491 on Sep. 12, 2016.

Non-Final Office Action issued in corresponding U.S. Appl. No. 15/217,040 dated Nov. 29, 2016.

(56) References Cited

OTHER PUBLICATIONS

Non-Final Office Action issued in corresponding U.S. Appl. No. 15/235,788 dated Dec. 14, 2016.
Non-Final Office Action issued in corresponding U.S. Appl. No. 15/145,491 dated May 15, 2017.
Non-Final Office Action issued in corresponding U.S. Appl. No. 15/486,970 dated Jun. 22, 2017.
Non-Final Office Action issued in corresponding U.S. Appl. No. 15/487,656 dated Jun. 23, 2017.
Non-Final Office Action issued in corresponding U.S. Appl. No. 15/487,694 dated Jun. 26, 2017.
Final Office Action issued in corresponding U.S. Appl. No. 15/294,349 dated Jul. 6, 2017.
Non-Final Office Action issued in corresponding U.S. Appl. No. 14/884,363 dated Sep. 5, 2017.
Final Office Action issued in corresponding U.S. Appl. No. 15/145,491 dated Sep. 6, 2017.
Non-Final Office Action issued in corresponding U.S. Appl. No. 14/881,535 dated Oct. 6, 2017.
Non-Final Office Action issued in corresponding U.S. Appl. No. 15/145,414 dated Nov. 29, 2017.
Non-Final Office Action issued in corresponding U.S. Appl. No. 15/644,487 dated Nov. 13, 2017.
Canadian Office Action dated Mar. 2, 2018 in related Canadian Patent Application No. 2,833,711.
Office Action dated Apr. 10, 2018 in related U.S. Appl. No. 15/294,349.
Office Action dated Apr. 2, 2018 in related U.S. Appl. No. 15/183,387.
Office Action dated May 29, 2018 in related U.S. Appl. No. 15/235,716.
Candian Office Action dated Apr. 18, 2018 in related Canadian Patent Application No. 2,928,711.
Canadian Office Action dated Jun. 22, 2018 in related Canadian Patent Application No. 2,886,697.
Office Action dated Jul. 25, 2018 in related U.S. Appl. No. 15/644,487.
Office Action dated Oct. 4, 2018 in related U.S. Appl. No. 15/217,081.
International Search Report and Written Opinion dated Sep. 19, 2018 in related PCT Patent Application No. PCT/US2018/040683.
Canadian Office Action dated Sep. 28, 2018 in related Canadian Patent Application No. 2,945,281.
Office Action dated Dec. 12, 2018 in related U.S. Appl. No. 16/160,708.
International Search Report and Written Opinion dated Jan. 2, 2019 in related PCT Patent Application No. PCT/US18/54542.
International Search Report and Written Opinion dated Jan. 2, 2019 in related PCT Patent Application No. PCT/US18/54548.
International Search Report and Written Opinion dated Dec. 31, 2018 in related PCT Patent Application No. PCT/US18/55913.
International Search Report and Written Opinion dated Jan. 4, 2019 in related PCT Patent Application No. PCT/US18/57539.
Non-Final Office Action dated Feb. 12, 2019 in related U.S. Appl. No. 16/170,695.
International Search Report and Written Opinion dated Feb. 15, 2019 in related PCT Patent Application No. PCT/US18/63977.
International Search Report and Written Opinion dated Mar. 5, 2019 in related PCT Patent Application No. PCT/US18/63970.
Non-Final Office Action dated Feb. 25, 2019 in related U.S. Appl. No. 16/210,749.
Non-Final Office Action dated Mar. 6, 2019 in related U.S. Appl. No. 15/183,387.
Office Action dated Jan. 30, 2019 in related Canadian Patent Application No. 2,936,997.
Office Action dated Mar. 1, 2019 in related Canadian Patent Application No. 2,943,275.
International Search Report and Written Opinion dated Apr. 10, 2019 in corresponding PCT Application No. PCT/US2019/016635.
Notice of Allowance dated Apr. 23, 2019 in corresponding U.S. Appl. No. 15/635,028.
International Search Report and Written Opinion dated Jul. 9, 2019 in corresponding PCT Application No. PCT/US2019/027584.

Kroposki et al., Making Microgrids Work, 6 IEEE Power and Energy Mag. 40, 41 (2008).
Dan T. Ton & Merrill A. Smith, The U.S. Department of Energy's Microgrid Initiative, 25 The Electricity J. 84 (2012), pp. 84-94.
Non-Final Office Action issued in U.S. Appl. No. 16/871,328 dated Dec. 9, 2021.
Non-Final Office Action issued in U.S. Appl. No. 16/943,935 dated Oct. 21, 2021.
Non-Final Office Action issued in U.S. Appl. No. 16/564,186, dated Oct. 15, 2021.
Final Office Action issued in U.S. Appl. No. 16/356,263 dated Oct. 7, 2021.
Non-Final Office Action issued in U.S. Appl. No. 17/060,647 dated Sep. 20, 2021.
Non-Final Office Action issued in U.S. Appl. No. 16/901,774 dated Sep. 14, 2021.
Canadian Office Action issued in Canadian Application No. 3,094,768 dated Oct. 28, 2021.
*U.S. Well Services, LLC* v *Tops Well Services, LLC and Honghua America, LLC*, Case No. 3:19-cv-00237, Document 72-9, Declaration of Dr. Robert Schaaf, Apr. 24, 2020, 52 pages.
*U.S. Well Services, LLC* v *Tops Well Services, LLC and Honghua America, LLC*, Case No. 3:19-cv-00237 Document 72-9, Declaration of Dr. Robert Schaaf—part 2, Apr. 24, 2020, 128 pages.
*U.S. Well Services, LLC* v *Tops Well Services, LLC and Honghua America, LLC*, Case No. 3:19-cv-00237, Document 72-9, Declaration of Dr. Robert Schaaf—part 3, Apr. 24, 2020, 47 pages.
*U.S. Well Services, LLC* v *Tops Well Services, LLC and Honghua America, LLC*, Case No. 3:19-cv-00237, Document 72, Plaintiffs Opening Claim Construction Brief, Apr. 24, 2020, 37 pages.
*U.S. Well Services, LLC* v *Tops Well Services, LLC and Honghua America, LLC*, Case No. 3:19-cv-00237, Document 1, Plaintiffs Original Complaint, 63 pages.
*U.S. Well Services, LLC* v *Tops Well Services, LLC and Honghua America, LLC*, Case No. 3:19-cv-00237, Document 90, Plaintiffs Opposition to Defendants' Motion for Summary Judgment of Invalidity under 35 USC 112, 30 pages.
*U.S. Well Services, LLC* v *Tops Well Services, LLC and Honghua America, LLC*, Case No. 3:19-cv-00237, Document 116, Hearing on Markman and Summary Judgment via Video Conference before the Honorable Andrew M. Edison Day 1 of 1 Day—Transcript, Jun. 15, 2020, 308 pages.
*Kirsch Research and Development, LLC* v *Tarco Specialty Products, Inc.*, Case No. 6:20-cv-00318-ADA, Document 62, Memorandum Opinion and Order Granting Defendant's Opposed Motion to Stay Pending Inter Partes Review of the '482 Patent [ECF No. 57], Oct. 4, 2021, 6 pages.
*Ledcomm LLC* v *Signfiy North America Corp., Signify Holding B.V., and Signify N.V.*, Case No. 6:20-cv-01056-ADA, Document 24, Scheduling Order, Aug. 13, 2021, 4 pages.
Transcend Shipping Systems, LLC and Hapag-Lloyd AG and Hapag-Lloyd (America) LLC, CMA CGM (America) LLC and CMA CGM S.A., Mediterranean Shipping Company S.A., Case Nos. 6:20-cv-1195-ADA, 6:21-cv-0018-ADA, and 6:21-cv-0040-ADA, Document 19, Proposed Amended Scheduling Order, Aug. 13, 2021, 6 pages.
*U.S. Well Services, Inc. and U.S. Well Services, LLC* v *Halliburton Company and Cimarex Energy Co.*, Case No. 6:21-cv-00367-ADA, Document 51, Agreed Scheduling Order, Sep. 16, 2021, 5 pages.
*U.S. Well Services, Inc. and U.S. Well Services, LLC* v *Halliburton Company and Cimarex Energy Co.*, Case No. 6:21-cv-00367-ADA, Plaintiffs Disclosure of Asserted Claims and Preliminary Infringement Contentions, Jul. 12, 2021, 9 pages.
*U.S. Well Services, Inc. and U.S. Well Services, LLC* v *Halliburton Company and Cimarex Energy Co.*, Case No. 6:21-cv-00367-ADA, Plaintiff U.S. Well Services, LLC's Disclosure of Extrinsic Evidence, Oct. 19, 2021, 10 pages.
*U.S. Well Services, Inc. and U.S. Well Services, LLC* v *Halliburton Company and Cimarex Energy Co.*, Case No. 6:21-cv-00367-ADA, Defendants' Preliminary Invalidity Contentions, Sep. 10, 2021, 193 pages.
*U.S. Well Services, Inc. and U.S. Well Services, LLC* v *Halliburton Company and Cimarex Energy Co.*, Case No. 6:21-cv-00367-ADA,

(56) References Cited

OTHER PUBLICATIONS

Document 1-8, Exhibit H, Halliburton—All Electric Fracturing Reducing Emissions and Cost, Apr. 15, 2021, 6 pages.
Bill Lockley and Barry Wood, "What do the API Motor/Generator Features Cost and What Do They Buy You?" 2010 IEEE, Paper No. PCIC-2010-22, 10 pages.
American Petroleum Institute, "Form-wound Squirrel-Cage Induction Motors—500 Horsepower and Larger," Jun. 2004, Fourth Edition, ANSI/API Standard 541-2003, 88 pages.
Assignment record of U.S. Pat. No. 9,366,114, accessed Aug. 19, 2021, 2 pages.
ASTM International, "Standard Specification for Steel Bars, Carbon and Alloy, Hot-Wrought, General Requirements" Oct. 13, 2006, 16 pages.
"U.S. Well Services Issues $125.5 Million Convertible Senior Secured PIK Notes, Executes License Agreement with ProFrac Manufacturing, LLC and Finalizes Amendment to Senior Secured Term Loan," Jun. 28, 2021, https://finance.yahoo.com/news/u-well-services-issues-125-203000637.html?guccounter=1, 6 pages.
Declaration of Joel N. Broussard, Case Nos. IPR2021-01032 & IPR2021-01033, Oct. 13, 2021, 9 pages.
Declaration of Dr. Robert Durham, Case Nos. IPR2021-01033, IPR2021-01032 and IPR2021-01034, Jun. 18, 2021, 179 pages.
Declaration of Robert Schaaf, Case Nos. IPR2021-01032 and IPR2021-01033, Oct. 12, 2021, 45 pages.
Declaration of Sylvia D. Hall-Ellis, Ph D., Case Nos. IPR2021-01032, IPR2021-01033, and IPR2021-01034, Jun. 18, 2021, 173 pages.
Stephen Cary et al., "Electric Rotating Machine Standards Part II. Magnetic Wedge Design & Monitoring Methods," 2011 IEEE, Paper No. PCIC-2011-41, 8 pages.
Janice Hoppe-Spiers, "Deploying Change," Energy & Mining International, Spring 2017, https//www.emi-magazine.com, 5 pages.
Jim Harris, "U.S. Well Services LLC—Energy and Mining Magazine," Energy & Mining International, Oct. 12, 2021, https://www.emi-magazine.com/sections/profiles/1221-us-well-services-llc, 3 pages.
"Clean Fleet Reduces Emissions by 99% at Hydraulic Fracturing Sites," Fluid Power Journal, https://fluidpowerjournal.com/clean-fleet-reduces-emissions/, accessed Sep. 22, 2021, 5 pages.
Gardner Denver, Well Servicing Pump Model GD-2500Q Quintuplex—Operating and Service Manual, Aug. 2005, 46 pages.
"Halliburton Delivers Successful Grid-Powered Frac Operation," https://www.halliburton.com/en/about-us/press-release/halliburton-delivers-first-successful-grid-powered-fracturing-operation, accessed Sep. 27, 2021, 4 pages.
Hart Energy, Hydraulic Fracturing Techbook, 2015, 99 pages.
R. Mistry et al., "Induction Motor Vibrations in view of the API 541—4th Edition," IEEE, accessed Jun. 10, 2021, 10 pages.
"Game-changing hydraulic fracturing technology, reduces emissions by 99%," Intrado Globe News Wire, Oct. 1, 2014, https://www.globenewswire.com/fr/news-release-2014/10/01/670029/10100696/en/Game-changing-hydraulic-facturing-technology-reduces-emissions-by-99.html, 4 pages.
M. Hodowanec et al., "Introduction to API Standard 541,4th Edition—Form-Wound Squirrel Cage Induction Motors—Larger than 500 Horsepower," 2003, IEEE, Paper No. PCIC-2003-33, 9 pages.
D. Bogh et al., "A User's Guide to Factory Testing of Large Motors: What Should Your Witness Expect," IEEE, accessed Jun. 10, 2021, 8 pages.
Ryan Davis, "Albright Says He'll Very Rarely Put Cases on Hold for PTAB," Law 360, https://www.law360.com/articles/1381597/print?section=ip, 2 pages.
Dani Kass, "Fintiv Fails: PTAB Uses "Remarkably Inaccurate" Trial Dates," Nov. 2, 2021, Law 360, 1 page.
Eugene A. Avallone et al., "Marks' Standard Handbook for Mechanical Engineers, 11th Edition," 2007, pp. 3-65, 14-2, 14-3, 14-13, 14-14, 20-91, 22-12, 22-13, 22-14, 22-15, 22-16, 10-3, 20-21, 20-22, 20-85, 20-86, 20-89, and 20-90.
T. W. Pascall et al., "Navigating the Test Requirements of API 541 4th Edition," 2007, IEEE, Paper No. PCIC-2007-11, 12 pages.
"Kerr Pumps & FlowVale Awards for Excellence in Well Completion, Northeast 2017—Awarded to: U.S. Well Services," https://www.oilandgasawards.com/winner/northeast-2017-kerr-pumps-flowvale-awards.., accessed Oct. 5, 2021, 4 pages.
"New Technology Development Award—General/Products, Northeast 2015—Awarded to: U.S. Well Services, LLC," https://www.oilandgasawards.com/winner/northeast-2015-new-technology-development-award-generalproducts/#, accessed Aug. 23, 2021, 4 pages.
*U.S. Well Services, Inc.* v. *Halliburton Company*, Civil Docket for Case # 6:21-cv-00367-ADA, https://ecf.txwd.uscourts.gov/cgi-bin/DktRpt.pl?190912742001885-L_1_0-1, Accessed Nov. 29, 2021, 13 pages.
A. T. Dufresne, "How reliable are trial dates relied on by the PTAB in the Fintiv analysis?" Perkins Coie, 2021, 3 pages.
J. Malinowski et al., "Petrochemical Standards A Comparison Between IEEE 841-2001, API 541, and API 547," 2004, IEEE, Paper No. PCIC-2004-22, 8 pages.
"Petroleum Alumnus and Team Develop Mobile Fracturing Unit that Alleviates Environmental Impact," 2015, LSU, https://www.lsu.edu/eng/news/2015/07/20150713-mobile-fracturing-unit.php, accessed Sep. 22, 2021, 2 pages.
Liz Hampton, "Low-cost fracking offers boon to oil producers, headaches for suppliers," Reuters, Sep. 12, 2019, https://www.reuters.com/article/us-usa-oil-electric-fracturing-focus/low-cost-fracking-offers-boon-to-oil-producers-headaches-for-supplies, 11 pages.
Liz Hampton, "U.S. Well Services files e-frac patent lawsuit against Halliburton, Cimarex Energy," Reuters, Apr. 15, 2021, https://www.reuters.com/business/energy/us-well-services-files-e-frac-patent-lawsuit-against-halliburton-cimarex-energy, 10 pages.
Borets, "Borets Oil Equipment," accessed Sep. 4, 2020, 158 pages.
Andrew Howard Nunn, "The feasibility of natural gas as a fuel source for modern land-based drilling," Dec. 2011, 94 pages.
R. Saidur, "Applications of variable speed drive (VSD) in electrical motors energy savings," 2012, vol. 16, pp. 543-550.
Discenzo, "Next Generation Pump Systems Enable New Opportunities for Asset Management and Economic Optimization," accessed Sep. 4, 2020, 8 pages.
Nikolich, "Compressors, pumps, refrigeration equipment: improvement and specialization of piston pumps for oil and gas well-drilling and production operations," 1996, Chemical and Petroleum Engineering, vol. 32, pp. 157-162.
Finger, "Sandia National Handbook Laboratories Report: Slimhole handbook: procedures and recommendations for slimhole drilling and testing in geothermal exploration," Oct. 1999, 164 pages.
Steve Besore, MTU Detroit Diesel Inc., "How to select generator sets for today's oil and gas drill rigs: careful comparison and selection can improve performance and reduce costs," May 5, 2010, 4 pages, https:/www.mtu-online.com/fileadmin/fm-dam/mtu-USA/mtuinnorthamerica/white-papers/WhitePaper_EDP.pdf.
Pemberton, "Strategies for Optimizing pump efficiency and LCC performance: process pumps are the largest consumers of energy in a typical pulp and paper mill—boosting their efficiency is a new avenue to reduced plant operating costs," Jun. 2003, Paper Age, pp. 28-32.
Robert B. Thompson, "Optimizing the production system using real-time measurements: a piece of the digital oilfield puzzle," Nov. 11-14, 2007, SPE Annual Technical Conference and Exhibition, Anaheim, CA, pp. 1-10.
Guffey, "Field testing of variable-speed beam-pump computer control," May 1991, SPE Production Engineering, pp. 155-160.
Irvine, "The use of variable frequency drives as a final control in the petroleum industry," 2000, IEEE, pp. 2749-2758.
R. Ikeda et al., "Hydraulic fracturing technique: pore pressure effect and stress heterogeneity," 1989, Int. J. Rock Mech. Min Sci. & Geomech., vol. 26, No. 6, pp. 471-475.
Coli Patent Application, "Mobile, modular, electrically powered system for use in fracturing underground formations," filed Apr. 7, 2011, 28 pages.
Gardner Denver—Well Servicing Pump Model GD-2500Q, GD-2500Q-HD, Quintuplex Pumps, GWS Fluid End Parts List, Jul. 2011, 39 pages.
Gardner Denver GD-2500Q Well Service Pump, 2 pages.

(56) References Cited

OTHER PUBLICATIONS

Gardner Denver C-2500 Quintuplex Well Service Pump, 2013, 2 pages.
Toshiba 2011 Industrial Catalog, Drives, PAC, PLCs, 2011, 272 pages.
Gardner Denver GD-2500 Quintuplex Well Service Pump, 2003, 2 pages.
Gardner Denver GD-2500Q Quintuplex Well Service Pump Operating and Service Manual, Aug. 2005, 46 pages.
Gardner Denver GD-2500Q Quintuplex Well Service Pump Power End Parts List, Apr. 2007, 15 pages.
Toshiba H9 ASD Installation and Operation Manual, Mar. 2011, 287 pages.
Offshore Technology Conference, Houston, TX, April 30-May 3, 2012, Honghua Group Brochure and Pictures, 6 pages.
Honghua Group Customer Spreadsheet, 2 pages.
Charlotte Owen, "Chinese company launches new fracking rigs," May 2, 2012, Oil & Gas Technology Magazine, 2 pages.
Honghua Group Limited, Complete Equipment and System Integrating by Using of Gas Power-gen and Power Grid and VFD System, 30 pages.
Honghua Group Limited, Is gas and electricity driven equipment the future trend for develop lithologic reservoirs, 2 pages.
ABB Group, MV Drive benefits for shale gas applications, Powerpoint, Apr. 2012, 16 pages.
U.S. Well Services, Game-changing hydraulic fracturing technology, reduces emissions by 99%: U.S. Well Services's patented clean fleet technology proven to cut emission, save fuel and allow for quieter operations on site, Oct. 1, 2014, 3 pages.
ASME, Hydraulic Fracturing's Greener Tint, Jan. 11, 2018, 2 pages.
Fluid Power, Clean Fleet Reduces Emissions by 99% at Hydraulic Fracturing Sites, Jan. 11, 2005, 3 pages.
Louisiana State University, Petroleum alumnus and team develop mobile fracturing unit that alleviates environmental impact, LSU School of EE & CS, Nov. 2012, 2 pages.
Linda Kane, Energy pipeline: US Well Services brings clean fleet to Weld County, Nov. 4, 2015, Greeley Tribute, 7 pages.
Business Wire, Hunghua Group showcases shale gas, offshore and land drilling solutions at the 2013 Offshore Technology Conference, May 6, 2013, 2 pages.
Joanne Liou, Hunghua Group introduces 6,000-hp integrated shale gas system, Drilling Matters, May 21, 2012, 2 pages.
TESS Record—Trademark for Clean Fleet registered Sep. 5, 2013, accessed Jan. 14, 2020, 2 pages.
U.S. Well Services, About U.S. Well Services, accessed Jan. 14, 2020, 14 pages.
Unknown, "Improving the Drilling Cycle," Oilfield Technology, Dec. 2009, vol. 2, Issue 9, 5 pages.
Unknown, "Andon (manufacturing)," last edited Septembers, 2019, https://en.wikipedia.org/w/index.php?title=Andon_(manufacturing)&oldid=914575778, 2 pages.
S.K. Subramaniam, "Production monitoring system for monitoring the industrial shop floor performance," 2009, International Journal of Systems Applications, Engineering & Development, vol. 3, Issue 1, pp. 28-35.
Unknown, Evolution Well Services advances fracturing operations with an electrically powered system,Calgary PR Mewswire, Jun. 4, 2012, 2 pages.
Honghua Group, Honghua America, LLC, HHF—1600 Mud Pump, 2 pages.
Honghua Group, Honghua Shale Gas Solutions Power Point Slides, Feb. 2012, 41 pages.
Mactel, Frac Test with VFDs Final Report Hydraulic Fracturing Pilot Test Results and Preliminary Full Scale Design United Nuclear Church Rock Facility, Dec. 23, 2003, 73 pages.
Jon Gates, ASME Hydraulic Fracturing Conference, Mar. 24, 2015, http://www.otrglobal.com/newsroom/cnotes/128720, 6 pages.
Gardner Denver Well Servicing Pump Model C2500Q Quintuplex Operating and Service Manual, Apr. 2011, 46 pages.
Coli, Mobile, modular, electrically powered system for use in fracturing underground formations using liquid petroleum gas, Oct. 5, 2012, U.S. Appl. No. 61/710,393, 59 pages.
Toshiba, G9 Brochure—G9 Series Adjustable Speed Drives, Jun. 2007, 6 pages.
Luis Gamboa, "Variable Frequency Drives in Oil and Gas Pumping Systems," Pumps & Systems, Dec. 17, 2011, https://www.pumpsandsystems.com/variable-frequency-drives-oil-and-gas-pumping-systems, 5 pages.
Unknown, "U.S. Well Services for Antero Fracking," Oct. 3, 2014, HHP Insight, http://hhpinsight.com/epoperations/2014/10/u-s-well-services-for-antero-fracking/, 3 pages.
Stuart H. Loewenthal, Design of Power-Transmitting Shafts, NASA Reference Publication 1123, Jul. 1984, 30 pages.
"VZ Environmental Award of Excellence in Environmental Stewardship, Rocky Mountain 2016—Awarded to: U.S. Well Services, LLC," Oil & Gas Awards, 2016, https://www.oilandgasawards.com/winner/rocky-mountain-2016-vz-environmental-award-for-excellence-in-environmental-stewardship, accessed Aug. 23, 2021, 4 pages.
Austin H. Bonnett, "Root Cause Failure Analysis for AC Induction Motors in the Petroleum and Chemical Industry," 2010, IEEE, Paper No. PCIC-2010-43, 13 pages.
Carolyn Davis, "Natural Gas Finding Niche in E-Fracking, But Diesel Still Rules," Sep. 6, 2019, Natural Gas Intel, https://www.naturalgasintel.com/natural-gas-finding-niche-in-e-fracking-but-diesel-still-rules, 9 pages.
Tim Rahill and Michael C. Fousha, "Sorting Out the Overlap," Jan./Feb. 2009, IEEE Industry Applications Magazine, 12 pages.
Jodi Shafto, "Growth in electric-fracking fleets stunted by tight producer budgets," Aug. 6, 2019, S&P Global Market Intelligence, https://wwww.spglobal.com/marketintelligence/en/news-insights/latest-news-headlines/growth-in-electric-facking-fleets-stunted-by-tight-producer-budgets, accessed Sep. 16, 2021, 4 pages.
A. H. Bonnett et al., "Squirrel Cage Rotor Options for A.C. Induction Motors," IEEE, accessed May 18, 2021, 4 pages.
U.S. Well Services Investor and Analyst Update: Second Quarter 2021 in Review, 2021, 7 pages.
Standing Order Governing Proceedings—Patent Cases, in the United States District Court for the Western District of Texas, Waco Division, filed Nov. 17, 2021, 11 pages.
U.S. Well Services—Services, http://uswellservices.com/services/, accessed Nov. 13, 2021, 10 pages.
Elsevier, "Variable Speed Pumping—A Guide to Successful Applications," 2019, 186 pages.
*U.S. Well Services, Inc., and U.S. Well Services, LLC v Halliburton Company, Cimarex Energy Co., Halliburton Energy Services, Inc., and Halliburton US Techologies, Inc.*, Case No. WA:21-CV-00367-ADA, Document 61, Order Setting Markman Hearing, Nov. 29, 2021, 1 page.
*U.S. Well Services, Inc., and U.S. Well Services, LLC v Halliburton Company, Cimarex Energy Co., Halliburton Energy Services, Inc., and Halliburton US Techologies, Inc.*, Case No. WA:21-CV-00367-ADA, Document 61, Order Resetting Markman Hearing, Dec. 8, 2021, 1 page.
Affidavit of Duncan Hall, Internet Archives on Jun. 7, 2021, https://web.archive.org/web/20120917102614/http:/www.quincieoilfield.com/pdf/3.0%20Gardner%20Denver/2500/GD2500Q%200p%20&%20Service%20Manual.pdf, 76 pages.
Non-Final Office Action issued in U.S. Appl. No. 16/871,928 dated Aug. 25, 2021.
Non-Final Office Action issued in U.S. Appl. No. 16/943,727 dated Aug. 3, 2021.
Non-Final Office Action issued in U.S. Appl. No. 14/881,525 dated Jul. 21, 2021.
Non-Final Office Action issued in U.S. Appl. No. 16/404,283 dated Jul. 21, 2021.
Notice of Allowance and Notice of Allowability issued in U.S. Appl. No. 15/829,419 dated Jul. 26, 2021.
Noodbury et al., "Electrical Design Considerations for Drilling Rigs," IEEE Transactions on Industry Applications, vol. 1A-12, No. 4, Jul./Aug. 1976, pp. 421-431.

(56) References Cited

OTHER PUBLICATIONS

Morris et al., U.S. Appl. No. 62/526,869; Hydration-Blender Transport and Electric Power Distribution for Fracturing Operation; Jun. 28, 2018; USPTO; see entire document.
Final Office Action dated Feb. 4, 2021 in U.S. Appl. No. 16/597,014.
International Search Report and Written Opinion dated Feb. 4, 2021 in PCT/US20/59834.
International Search Report and Written Opinion dated Feb. 2, 2021 in PCT/US20/58906.
International Search Report and Written Opinion dated Feb. 3, 2021 in PCT/US20/58899.
Non-Final Office Action dated Jan. 29, 2021 in U.S. Appl. No. 16/564,185.
Final Office Action dated Jan. 21, 2021 in U.S. Appl. No. 16/458,696.
Final Office Action dated Jan. 11, 2021 in U.S. Appl. No. 16/404,283.
Non-Final Office Action dated Jan. 4, 2021 in U.S. Appl. No. 16/522,043.
International Search Report and Written Opinion dated Dec. 14, 2020 in PCT/US2020/53980.
Non-Final Office Action issued in corresponding U.S. Appl. No. 16/170,695 dated Jun. 7, 2019.
Non-Final Office Action issued in corresponding U.S. Appl. No. 16/268,030 dated May 10, 2019.
Final Office Action issued in corresponding U.S. Appl. No. 16/210,749 dated Jun. 11, 2019.
Canadian Office Action dated May 30, 2019 in corresponding CA Application No. 2,833,711.
Canadian Office Action dated Jun. 20, 2019 in corresponding CA Application No. 2,964,597.
International Search Report and Written Opinion dated Jul. 9, 2019 in related PCT Application No. PCT/US2019/027584.
Office Action dated Jun. 7, 2019 in related U.S. Appl. No. 16/268,030.
International Search Report and Written Opinion dated Sep. 11, 2019 in related PCT Application No. PCT/US2019/037493.
Office Action dated Aug. 19, 2019 in related U.S. Appl. No. 15/356,436.
Office Action dated Oct. 2, 2019 in related U.S. Appl. No. 16/152,732.
Office Action dated Sep. 11, 2019 in related U.S. Appl. No. 16/268,030.
Office Action dated Oct. 11, 2019 in related U.S. Appl. No. 16/385,070.
Office Action dated Sep. 3, 2019 in related U.S. Appl. No. 15/994,772.
Office Action dated Sep. 20, 2019 in related U.S. Appl. No. 16/443,273.
Canadian Office Action dated Oct. 1, 2019 in related Canadian Patent Application No. 2,936,997.
International Search Report and Written Opinion dated Nov. 26, 2019 in related PCT Application No. PCT/US19/51018.
Office Action dated Dec. 6, 2019 in related U.S. Appl. No. 16/564,186.
International Search Report and Written Opinion dated Jan. 2, 2020 in related PCT Application No. PCT/US19/55325.
Notice of Allowance dated Jan. 9, 2020 in related U.S. Appl. No. 16/570,331.
Non-Final Office Action dated Dec. 23, 2019 in related U.S. Appl. No. 16/597,008.
Non-Final Office Action dated Mar. 3, 2020 in related U.S. Appl. No. 16/152,695.
International Search Report and Written Opinion dated Feb. 11, 2020 in related PCT Application No. PCT/US2019/055323.
Final Office Action dated Mar. 31, 2020 in related U.S. Appl. No. 15/356,436.
Non-Final Office Action dated May 20, 2020 in related U.S. Appl. No. 14/881,535.
Non-Final Office Action dated May 22, 2020 in related U.S. Appl. No. 16/458,696.
Non-Final Office Action dated May 8, 2020 in related U.S. Appl. No. 15/145,443.
International Search Report and Written Opinion dated Jun. 2, 2020 in related PCT Application No. PCT/US20/23809.
Karin, "Duel Fuel Diesel Engines," (2015), Taylor & Francis, pp. 62-63, Retrieved from https://app.knovel.com/hotlink/toc/id:kpDFDE0001/dual-fueal-diesel-engines/duel-fuel-diesel-engines.
Goodwin, "High-voltage auxiliary switchgear for power stations," Power Engineering Journal, 1989, 10 pg.
International Search Report and Written Opinion dated Jun. 23, 2020 in corresponding PCT Application No. PCT/US20/23912.
International Search Report and Written Opinion dated Jul. 22, 2020 in corresponding PCT Application No. PCT/US20/00017.
Office Action dated Aug. 4, 2020 in related U.S. Appl. No. 16/385,070.
Office Action dated Jun. 29, 2020 in related U.S. Appl. No. 16/404,283.
Office Action dated Jun. 29, 2020 in related U.S. Appl. No. 16/728,359.
Office Action dated Jun. 22, 2020 in related U.S. Appl. No. 16/377,861.
Canadian Office Action dated Aug. 18, 2020 in related CA Patent Application No. 2,933,444.
Canadian Office Action dated Aug. 17, 2020 in related CA Patent Application No. 2,944,968.
Office Action dated Jul. 23, 2020 in related U.S. Appl. No. 16/597,014.
Non-Final Office dated Oct. 26, 2020 in U.S. Appl. No. 15/356,436.
Non-Final Office dated Oct. 5, 2020 in U.S. Appl. No. 16/443,273.
Non-Final Office Action dated Sep. 29, 2020 in U.S. Appl. No. 16/943,727.
Non-Final Office Action dated Sep. 2, 2020 in U.S. Appl. No. 16/356,263.
Non-Final Office Action dated Aug. 31, 2020 in U.S. Appl. No. 16/167,083.
Albone, "Mobile Compressor Stations for Natural Gas Transmission Service," ASME 67-GT-33, Turbo Expo, Power for Land, Sea and Air, vol. 79887, p. 1-10, 1967.
Canadian Office Action dated Sep. 22, 2020 in Canadian Application No. 2,982,974.
International Search Report and Written Opinion dated Sep. 3, 2020 in PCT/US2020/36932.
"Process Burner" (https://www.cebasrt.com/productsloii-gaslprocess-burner) 06 Sep. 6, 2018 (Sep. 6, 2018), entire document, especially para (Burners for refinery Heaters].
Water and Glycol Heating Systems* (https://www.heat-inc.com/wg-series-water-glycol-systems/) Jun. 18, 2018 (Jun. 18, 2018), entire document, especially WG Series Water Glycol Systems.
"Heat Exchanger" (https://en.wiklpedia.org/w/index.php?title=Heat_exchanger&oldid=89300146) Dec. 18, 2019 Apr. 2019 (Dec. 18, 2019), entire document, especially para (0001].
Canadian Office Action dated Sep. 8, 2020 in Canadian Patent Application No. 2,928,707.
Canadian Office Action dated Aug. 31, 2020 in Canadian Patent Application No. 2,944,980.
International Search Report and Written Opinion dated Aug. 28, 2020 in PCT/US20/23821.
International Search Report and Written Opinion mailed in PCT/US20/67526 dated May 6, 2021.
International Search Report and Written Opinion mailed in PCT/US20/67608 dated Mar. 30, 2021.
International Search Report and Written Opinion mailed in PCT/US20/67528 dated Mar. 19, 2021.
International Search Report and Written Opinion mailed in PCT/US20/67146 dated Mar. 29, 2021.
International Search Report and Written Opinion mailed in PCT/US20/67523 dated Mar. 22, 2021.
International Search Report and Written Opinion mailed in PCT/US2020/066543 dated May 11, 2021.
Response to Non-Final Office Action dated Aug. 3, 2015 in related U.S. Appl. No. 13/679,689, 62 pages.
George E. King, "Hydraulic Fracturing 101: What Every Representative, Environmentalist, Regulator, Reporter, Investor, University Researcher, Neighbor and Engineer Should Know About Estimating Frac Risk and Improving Frac Performance in Unconventional Gas and Oil Wells," Feb. 6-8, 2012, Society of Petroleum Engineers, 80 pages.

(56) References Cited

OTHER PUBLICATIONS

Gardner Denver Pumps, GD2500Q Quintuplex Pump, Oct. 14, 2019, http://www.gardnerdenver.com/en-us/pumps/quintuplex-pump-gd-2500q#menu, 7 pages.
TMEIC, TMEIC Industrial Motors Manual, 2012, 12 pages.
Toshiba, Toshiba Q9 ASD Installation and Operation Manual, Apr. 2010, 233 pages.
ABB, ABB drives in power generation: medium voltage drives for more efficient and reliable plant operation, 2006, 12 pages.
ABB, Industry Brochure—ABB drives in chemical, oil and gas medium voltage drives for greater profitability and performance, 2009, 16 pages.
ABB, ABB drives in chemical, oil and gas Medium voltage drives for greater profitability and performance, 2011, 16 pages.
ABB, Drive PC Tools: Startup and maintenance, DriveWindow Light, 2014, 2 pages.
ABB, Global Center of Excellence DC Drives: DriveWindow light upgrade for DC drives Used for DWL 2.95 and DC DriveAP, Dec. 4, 2018, 1 page.
ABB, ABB Drive Ware User's Manual, DriveWindow 2, Dec. 31, 2012, 604 pages.
ABB, ABB Drive Ware User's Guide, DriveWindow Light 2, Oct. 15, 2013, 45 pages.
Warren Electric Corp., Hydraulic heaters maintain fluid quality and consistency, Hydraulics & Pneumatics, Dec. 30, 2010, 12 pages.
Onyx Industries Inc., Stack Light Engineering Reference Guide, Sep. 23, 2012, 4 pages.
U.S. Well Services, Inc. files suit against Halliburton Company and Cimarex Energy Co. for patent infringement, Apr. 15, 2021, PR Newswire, https://www.prnewswire.com/news-releases/us-well-services-inc-files-suit-against-halliburton-company-and-cimarex-energy-co-for-patent-infringement-301270118.html, 2 pages.
Services—U.S. Well Services, http://uswellservices.com/services/, accessed Nov. 13, 2021, 10 pages.
Publications, U.S. Department of Labor—Occupational Safety and Health Administration, https://web.archive.org/web/20150626140537/https://www.osha.gov/pls/publications/publication.html, 47 pages.
OSHA Publications, U.S. Department of Labor—Occupational Safety and Health Administration, https://web.archive.org/web/20150406054914/https://www.osha.gov/pls/publications/publication.AthruZ?pType=Industry, Jun. 13, 2021, 3 pages.
U.S. Department of Labor—Occupational Safety and Health Administration, https://web.archive.org/web/20150406152927/https://www.osha.gov/, 4 pages.
Steven C. Carlson, Weaponizing IPRs, Landslide, Sep. 22, 2019, 10 pages.
Declaration of Dr. Mark Ehsani, IPR2021-01066, Jul. 2, 2021, 213 pages.
Declaration of Robert Schaaf, IPR2021-01066, Nov. 17, 2021, 43 pages.
U.S. Appl. No. 62/823,303.
Amazon.com purchase page for Electrical Engineering Reference Manual for the Electrical and Computer PE Exam, Sixth Edition, https://web.archive.org/web/20070103124447/https:/www.amazon.com/Electrical-Engineering-Reference-Manual-Computer/dp/1888577568/, accessed Jul. 23, 2021, 7 pages.
Public Catalog of the U.S. Copyright Office for search result: electrical engineering reference manual, https://cocatalog.loc.gov/cgi-bin/Pwebrecon.cgi?v1=6&ti=1, 6&Search_Arg=electrical engineering reference manual&Search_Code=TALL&CNT=25&PI . . . , accessed Jul. 21, 2021, 2 pages.
Declaration of Robert Schaaf, IPR2021-01238, Nov. 17, 2021, 38 pages.
John A. Camera, PE, Electrical Engineering Reference Manual for the Electrical and Computer PE Exam, Sixth Edition, 2002, 102 pages.
U.S. Appl. No. 62/180,289.
IEEE 100 The Authoritative Dictionary of IEEE Standards Terms Seventh Edition, 2000, 7 pages.
National Electrical Manufacturers Association, NEMA ICS 61800-4 Adjustable Speed Electrical Power Drive Systems, Part 4: General Requirements—Rating Specifications for A.C. Power Drive Systems above 1000 V a.c. and Not Exceeding 35 kV, 2004 22 pages.
Professional Publications, Inc., FE Exam, PE Exam, ARE Exam, and NCIDQ Exam Review / Professional Engineering Licensing, About PPI, https://web.archive.org/web/20031219231426/http://ppi2pass.com:80/catalog/servlet/MyPpi_pg_aboutppi.html, accessed Jul. 22, 2021, 1 page.
Professional Publications, Inc., FE Exam, PE Exam, ARE Exam, and NCIDQ Exam Review / Professional Engineering Licensing, What PPI Customers Say, https://web.archive.org/web/20031226130924/http://ppi2pass.com:80/catalog/servlet/MyPpi_pg_comments-EEcomments.html, accessed Jul. 22, 2021, 2 pages.
Professional Publications, Inc., FE Exam, PE Exam, ARE Exam, and NCIDQ Exam Review / Professional Engineering Licensing, Homepage, https://web.archive.org/web/20040209054901/http://ppi2pass.com:80/catalog/servlet/MyPpi, accessed Jul. 19, 2021, 1 page.
Professional Publications, Inc., FE Exam, PE Exam, ARE Exam, and NCIDQ Exam Review / Professional Engineering Licensing, The PPI Online Catalog, https://web.archive.org/web/20040215142016/http://ppi2pass.com:80/catalog/servlet/MyPpi_ct_MAIN, accessed Jul. 19, 2021, 2 pages.
Professional Publications, Inc., FE Exam, PE Exam, ARE Exam, and NCIDQ Exam Review / Professional Engineering Licensing, Electrical PE Exam Review Products, https://web.archive.org/web/20040214233851/http://ppi2pass.com:80/catalog/servlet/MyPpi_ct_ELECTRICAL, accessed Jul. 19, 2021, 7 pages.
Professional Publications, Inc., FE Exam, PE Exam, ARE Exam, and NCIDQ Exam Review / Professional Engineering Licensing, Instructor's Corner, https://web.archive.org/web/20031219232547/http://ppi2pass.com:80/catalog/servlet/MyPpi_pg_corner-corner.html, accessed Jul. 19, 2021, 2 pages.
Professional Publications, Inc., FE Exam, PE Exam, ARE Exam, and NCIDQ Exam Review / Professional Engineering Licensing, Teaching an Electrical and Computer Engineering PE Exam Review Course, https://web.archive.org/web/20031223100101/http://ppi2pass.com:80/catalog/servlet/MyPpi_pg_corner-teachee.html, accessed Jul. 19, 2021, 2 pages.
Professional Publications, Inc., Electrical Engineering Reference Manual, 12 pages.
Professional Publications, Inc., Books for the FE, PE, FLS and PLS Exams, Spring 2004, http://www.ppi2pass.com/corner/catalog.pdf, 16 pages.
Lionel B. Roe, Practices and Procedures of Industrial Electrical Design, 1972, McGraw-Hill, Inc., Chapter 2: The Basic Electric System, 11 pages.
Declaration of Duncan Hall, Jul. 23, 2021, https://web.archive.org/web/20031219231426/http://ppi2pass.com:80/catalog/servlet/MyPpi_jg_aboutppi.html, 12 pages.
Declaration of Robert Durham, IPR2021-01315, Aug. 12, 2021, 209 pages.
Declaration of Robert Schaaf, IPR2021-01315, Nov. 19, 2021, 39 pages.
U.S. Appl. No. 62/323,168.
*U.S. Well Services, Inc. and U.S. Well Services, LLC* v *Halliburton Company and Cimarex Energy Co.*, Case No. 6:21-cv-00367-ADA, Document 63, Defendants' Claim Construction Brief in Reply to U.S. Well Services, LLC's Responsive Brief, Dec. 2, 2021, 30 pages.
*U.S. Well Services, Inc.* v *Halliburton Company*, Case No. 6:21-cv-00367-ADA, Civil Docket, accessed Dec. 17, 2021, 14 pages.
*U.S. Well Services, Inc.* v *Halliburton Company*, Case No. 6:21-cv-00367-ADA, Document 64, Order Resetting Markman Hearing, Decembers, 2021, 1 page.
Approved American National Standard, ANSI/NEMA MG Jan. 2011, American National Standard Motors and Generators, Dec. 9, 2021, 636 pages.
Comprehensive Power: Power it Up, Feb. 27, 2013, 28 pages.
Comprehensive Power: Power it Up, Brochure, 26 pages.
Declaration of Robert Schaaf, IPR2021-01316, Nov. 19, 2021, 33 pages.

(56) References Cited

OTHER PUBLICATIONS

Declaration of Robert Durham, IPR2021-01316, Aug. 13, 2021, 75 pages.
Declaration of Robert Schaaf, IPR2021-01538, Dec. 28, 2021, 40 pages.
Declaration of Dr. L. Brun Hilbert, Jr., P.E., IPR2021-01538, Sep. 22, 2021, 99 pages.
Maxwell James Clerk 1868, On Governors, Proc. R. Soc. Lond., pp. 16270-283.
Katsuhiko Ogata, Modern Control Engineering: Third Edition, 1997, 2 pages.
49 C.F.R. Part 393 (Oct. 1, 2006), 36 pages.
Gardner Denver, 3" 1502 Male Hammer Union Discharge Flange, 2005, 13 pages.
Donald G. Fink, "Standard Handbook for Electrical Engineers— Thirteenth Edition," 1993, McGraw-Hill Inc., pp. 10-13, 20-21, 20-22, 20-85, 20-20, 20-89, 20-90, 20-91, 22-12, 22-13, 22-14, 22-15 and 22-16.
Email from Michael See on Jun. 10, 2021 regarding API-541 Fourth Edition: Public Availability, 2 pages.
Halliburton, Halliburtion All-Electric Fracturing Reducing Emissions and Cost Brochure, 2021, 6 pages.
IEEE Power Engineering Society, 112 IEEE Standard Test Procedure for Polyphase Induction Motors and Generators, 2004, 87 pages.
*U.S. Well Services, LLC* v *Tops Well Services, LLC*, Case No. 3:19-cv-237, Document 135, Order, Sep. 22, 2021, 2 pages.
*U.S. Well Services, Inc. and U.S. Well Services, LLC* v *Halliburton Company and Cimarex Energy Co.*, Case No. 6:21-cv-00367-ADA, Document 56, Defendants' Opening Claim Construction Brief, Oct. 27, 2021, 46 pages.
"Screenshot of USWS Clean Fleet System Video," 1 page.
John Daniel, "8.30 DEP Industry Observations: New Flac Fleet; New Fleet Designs Forthcoming," Daniel Energy Partners, Aug. 30, 2020, 13 pages.
Declaration of Joel N. Broussard, IPR2021-01034, IPR2021-01035, IPR2021-01036, and IPR2021-01037, Oct. 20, 2021, 11 pages.
Declaration of Robert Schaaf, IPR2021-01034, Oct. 20, 2021, 47 pages.
Declaration of Dr. Mark Ehsani, IPR2021-01035, Jun. 18, 2021, 188 pages.
Stan Gibilisco, The Illustrated Dictionary of Electronics: Audio/Video Consumer Electronics Wireless Technology -Eighth Edition, 2001, p. 667.
Declaration of Robert Schaaf, IPR2021-01035, Oct. 20, 2021, 51 pages.
Declaration of Dr. L. Brun Hilbert, P.E., IPR2021-01037 and IPR2021-01038, Jun. 21, 2021, 124 pages.
U.S. Appl. No. 62/242,173.
Declaration of Robert Schaaf, IPR2021-01037, Oct. 20, 2021, 52 pages.
Zeus Electric Pumping Unit, Halliburton, http://www.halliburton.com/en/products/zeus-electric-pumping-unit, 2021, 4 pages.
Declaration of Joel N. Broussard, IPR2021-01038, Oct. 20, 2021, 11 pages.
*LedComm LLC* v *Signify North America Corporation*, Case No. 6:20-cv-01056-ADA, Civil Docket, accessed Dec. 3, 2021, 11 pages.
*U.S. Well Services, Inc.* v *Halliburton Company*, Case No. 6:21-cv-00367-ADA, Civil Docket, accessed Dec. 13, 2021, 14 pages.
Declaration of Robert Schaaf, IPR2021-01038, Nov. 10, 2021, 40 pages.
*Transcend Shipping Systems LLC* v *Mediterranean Shipping Company S.A.*, Case No. 6:21-cv-00040, Document 27, Order of Dismissal with Prejudice, Dec. 7, 2021, 1 page.
Centers for Disease Control and Prevention, NIOSH Numbered Publications, https://web.archive.org/web/20120721180008/http://www.cdc.org/niosh/pubs/all_date_desc_nopubnumbers.html, 2012, 57 pages.
America Invents Act, H.R. Rep. No. 112-98, Jun. 1, 2011, 165 pages.
Declaration of Joel N. Broussard, IPR2021-01065, Oct. 20, 2021, 11 pages.
Declaration of Dr. Robert Durham, IPR2021-01065, Jun. 18, 2021, 138 pages.
Declaration of Robert Schaaf, IPR2021-01065, Nov. 10, 2021, 33 pages.
U.S. Pat. No. 9,410,410, Excerpt—Response to Non-Final Office Action filed Feb. 3, 2016.
U.S. Appl. No. 62/242,566.
Industrial Safety & Hygiene News, OSHA issues hazard alert for fracking and drilling, Jan. 6, 2015, 1 page.
Portfolio Media Inc., A Shift to Sand: Spotlight on Silica Use in Fracking, Law360, https://www.law360.com/articles/366057/print?section=energy, accessed Jun. 10, 2021, 5 pages.
Henry Chajet, "OSHA Issues Alert on Non-Silica Fracking Hazards," Jan. 30, 2015, National Law Review Newsroom, 2 pages.
*U.S. Well Services, LLC*, v *Voltagrid LLC, Nathan Ough, Certarus (USA) Ltd., and Jared Oehring*, Case No. 4:21-cv-3441-LHR, Document 13, Plaintiff U.S. Well Services, LLC's Motion for Preliminary Injunction and Request for Hearing, Nov. 4, 2021, 311 pages.
U.S. Department of Labor—Occupational Safety and Health Administration, Hydraulic Fracturing and Flowback Hazards Other than Respirable Silica, 27 pages.
U.S. Department of Labor—Occupational Safety and Health Administration, Hazard Alert—Worker Exposure to Silica Turing Hydraulic Fracturing, 2012, 7 pages.
U.S. Department of Labor—Occupational Safety and Health Administration, OSHA and NIOSH issued hazard alert on ensuring workers in hydraulic fracturing operations have appropriate protections from silica exposure, Jun. 21, 2012, 4 pages.
Occupational Safety and Health Administration—Home, United States Department of Labor, https://web.archive.org/web/20120722160756/http://www.osha.gov/, accessed Jun. 13, 2021, 2 pages.
Industry/Hazard Alerts, United States Department of Labor, https://web.archive.org/web/20120801064838/http://www.osha.gov:80/hazardindex.html, accessed Jun. 13, 2021, 1 page.
Hazard Alert—Worker Exposure to Silica during Hydraulic Fracturing, United States Department of Labor, https://web.archive.org/web/20120808200919/http://www.osha.gov/dts/hazardalerts/hydraulic_frac_hazard_alert.html, accessed Jun. 13, 2021, 5 pages.
A. Abbott, Crippling the Innovation Economy: Regulatory Overreach at the Patent Office, Regulatory Transparency Project, Aug. 14, 2017, 35 pages.
D. Heidel, Safety and Health Management Aspects for Handling Silica-based Products and Engineered Nanoparticles in Sequences of Shale Reservoir Stimulations Operations, Society of Petroleum Engineers, 2004, 4 pages.
Testimony of Judge Paul R. Michel (Ret.) United States Court of Appeals for the Federal Circuit Before the Subcommittee on Intellectual Property, U.S. Senate Committee on the Judiciary, Jun. 4, 2019, 8 pages.
Bernard D. Goldstein, The Role of Toxicological Science in Meeting the Challenges and Opportunities of Hydraulic Fracturing, 2014, Toxicological Sciences, vol. 139, No. 2, pp. 271-283.
Mike Soraghan, OSHA issues hazard alert for fracking and drilling, E&E, Dec. 10, 2014, 1 page.
The American Heritage Dictionary of the English Language, Fifth Edition, Fiftieth Anniversary, p. 911.
Collins English Dictionary, Twelfth Edition, 2014, p. 1005.
Declaration of Robert Schaaf, IPR2021-01539, Jan. 25, 2022, 37 pages.
Department of Transportation, Federal Motor Carrier Safety Administration, 49 CFR Parts 390, 392 and 393—Parts and Accessories Necessary for Safe Operation; General Amendments; Final Rule, Federal Register, Aug. 15, 2005, vol. 70, No. 156, 49 pages.
D. Nedelcut et al., "On-line and Off-line Monitoring-Diagnosis System (MDS) for Power Transformers," IEEE, 2008 International Conference on Condition Monitoring and Diagnosis, Beijing, China, Apr. 21-24, 2008, 7 pages.

(56) References Cited

OTHER PUBLICATIONS

Random House Webster's Unabridged Dictionary, Second Edition, 2001, p. 990.
A. B. Lobo Ribeiro et al., "Multipoint Fiber-Optic Hot-Spot Sensing Network Integrated Into High Power Transformer for Continuous Monitoring," IEEE Sensors Journal, Jul. 2008, vol. 8, No. 7, pp. 1264-1267.
Society of Automotive Engineers, SAE J1292: Automobile, Truck, Truck-Tractor, Trailer, and Motor Coach Wiring, 49 CFR 393.28, Oct. 1981, 6 pages.
"StarTech NETRS2321E 1 Port RS-232/422/485 Serial over IP Ethernet Device Server," StarTech, http://www.amazon.com/StarTech-NETRS2321E-RS-232-Serial-Ethernet/dp/B000YN0NOS, May 31, 2014, 4 pages.
"StarTech.com 1 Port RS232 Serial to IP Ethernet Converter (NETRS2321P)," StarTech, http://www.amazon.com/StarTech-com-Serial-Ethernet-Converter-NETRS232IP/dp/B00FJEHNSO, Oct. 9, 2014, 4 pages.
"TCP/IP Ethernet to Serial RS232 RS485 RS422 Converter," Atc, http://www.amazon.com/Ethernet-Serial-RS232-RS485-Converter/dp/B00ATV2DX2, Feb. 1, 2014, 2 pages.
"SainSmart TCP/IP Ethernet to Serial RS232 RS485 Intelligent Communication Converter," SainSmart, http://www.amazon.com/SainSmart-Ethernet-lntelligent-Communication-Converter/dp/B008BGLUHW, Aug. 17, 2014, 4 pages.
"Global Cache iTach, IP to Serial with PoE (IP2SL-P)," Global Cache, https://www.amazon.com/Global-Cache-iTach-Serial-IP2SL-P/dp/B003BFVNS4/, Oct. 30, 2014, 3 pages.
Declaration of Robert Durham, IPR2022-00074, Nov. 8, 2021, 177 pages.
Declaration of Robert Schaaf, IPR2022-00074, Feb. 17, 2022, 36 pages.
U.S. Appl. No. 62/204,331.
Eugene A. Avallone, Marks' Standard Handbook for Mechanical Engineers: 11th Edition, 2007, p. 16-4 and 16-22.
Moxa 802.11 Ethernet to Serial, Moxastore, http://www.moxastore.com/Moxa_802_11_Wi_Fi_Ethernet_to_Serial_s/587.html, May 24, 2016, 1 page.
Project Registration, Moxastore, http://www.moxastore.com, Feb. 15, 2015, 2 pages.
About Us, Moxastore, http://www.moxastore.com/aboutus.asp, Mar. 8, 2015, 1 page.
NPORTIA5250, Moxastore, http://www.moxastore.com/NPORTIA5250_p/nportia5250.htm.
Declaration of Duncan Hall, Internet Archive, Oct. 26, 2021, https://web.archive.org/web/20140531134153/http://www.amazon.com/StarTech-NETRS2321E-RS-232-Serial-Ethernet/dp/B000YB0NOS, 43 pages.
Michael Quentin Morton, Unlocking the Earth: A Short History of Hydraulic Fracturing (2013), GeoExpro, vol. 10, No. 6, 5 pages.
Accommodating Seismic Movement, Victaulic Company, 2015, https://web.archive.org/web/20150412042941/http://www.victaulic.com:80/en/businesses-solutions/solutions/accommoda . . . , 2 pages.
Style W77 AGS Flexible Coupling, Victaulic Company 2015, https://web.archive.org/web/20150423052817/http://www.victaulic.com:80/en/products-services/products/style-w77-ags-f . . . , 1 page.
AGS Large Diameter Solutions, Victaulic Company, 2015, https://web.archive.org/web/20150419063052/http://www.victaulic.com:80/en/businesses-solutions/solutions/advanced-gr . . . , 2 pages.
Chiksan Original Swivel Joints, FMC, 1997, 16 pages.
CoorsTek Flowguard Products, 2012, 8 pages.
Declaration of Sylvia D. Hall-Ellis, IPR2022-00610, Feb. 28, 2022, 98 pages.
Flowline Products and Services, FMC Technologies, http://www.fmctechnologies.com, 80 pages.
Gardner Denver, Well Servicing Pump Model GD-2500Q, GD-2500Q-HD, Quintuplex Pumps, Sep. 2011, 45 pages.
Eugene A. Avallone, Marks' Standard Handbook for Mechanical Engineers: 11th Edition, 2007, Section 14, 18 pages.
Mohinder L. Nayyar, Piping Handbook Seventh Edition, McGraw-Hill Handbook, 2000, 77 pages.
Pulsation Dampers, Coorstek, 2014, https://web.archive.org/web/20140919005733/http://coorstek.com/markets/energy_equip . . . , 2 pages.
M. E. Rahman et al., "Wire rope isolators for vibration isolation of equipment and structures—A review," IOP Conference Series Materials Science and Engineering, Apr. 2015, 12 pages.
Victaulic Couplings Vibration Attenuation Characteristics, Victaulic, Publication 26.04, Oct. 2014, 5 pages.
Thorndike Saville, The Victaulic Pipe Joint, Journal of American Water Works Association, Nov. 1922, vol. 9, No. 6, pp. 921-927.
J. C. Wachel et al., "Analysis of Vibration and Failure Problems in Reciprocating Triplex Pumps for Oil Pipelines," The American Society of Mechanical Engineers, Presented at the Energy-Sources and Technology Conference and Exhibition, Dallas, Texas, Feb. 17-21, 1985, 8 pages.
Declaration of Nathaniel E. Frank-White, Internet Archive, Feb. 17, 2022, http://web.archive.org/web/20140329090440/http://www.enidline.com/pdffiles/WR_Catalog_2012.pdf, 82 pages.
Wire Rope Isolator Technologies, Enidine, Dec. 2011, 78 pages.
World's Best Swivel Joints, Flowvalve, 2013, https://web.archive.org/web/20150117041757/http://www.flowvalve.com:80/swivels, 10 pages.
Non-Final Office Action issued in U.S. Appl. No. 14/881,535 dated May 20, 2020.
Non-Final Office Action issued in U.S. Appl. No. 15/145,443 dated May 8, 2020.
Non-Final Office Action issued in U.S. Appl. No. 16/458,696 dated May 22, 2020.
International Search Report and Written Opinion issued in PCT/US2020/023809 dated Jun. 2, 2020.
Karin, "Duel Fuel Diesel Engines," (2015), Taylor & Francis, pp. 62-63, Retrieved from https://app.knovel.com/hotlink/toc/id:kpDFDE0001/dual-fueal-diesel-engines/duel-fuel-diesel-engines (Year 2015).
Goodwin, "High-voltage auxilliary switchgear for power stations," Power Engineering Journal, 1989, 10 pg. (Year 1989).

\* cited by examiner

ENCODERLESS VECTOR CONTROL FOR VFD IN HYDRAULIC FRACTURING APPLICATIONS

CROSS REFERENCE TO RELATED APPLICATION(S)

This application is related to and claims the benefit of priority from U.S. Provisional Application 62/847,022, filed May 13, 2019, titled ENCODERLESS VECTOR CONTROL FOR VFD IN HYDRAULIC FRACTURING APPLICATIONS, the entire disclosure of which is incorporated by reference herein for all intents and purposes.

REFERENCE TO MATERIAL IN COMPACT DISC

The application incorporates by reference the material on the concurrently submitted compact disc (CD) as allowed under 37 C.F.R. §§ 1.52 and 1.77(b)(5)), which is identified as file named "Appendix A Table 1," which is 82.8 KB, created May 8, 2020, in CDs labeled Copies 1 and 2 (the names of the files contained on each of the compact discs, their date of creation and their sizes in bytes), which may be referenced throughout this disclosure as Appendix A.

FIELD

At least one embodiment pertains to improvements in electric motors in fracturing operations. In at least one embodiment, the present disclosure describes fracturing pumps that are coupled to an electric motor, which in turn is controlled via an encoderless vector control subsystem.

BACKGROUND

Hydraulic Fracturing is a process used to stimulate production from some hydrocarbon producing wells. The process involves injecting fluid with pumps into a wellbore at a pressure sufficient to generate fissures in the formation surrounding the wellbore. The pressurized fluid is injected into a portion of the wellbore that is pressure-isolated from the remaining length of the wellbore so that fracturing is limited to a designated portion of the formation. The fracturing fluid slurry, whose primary component may be water, includes proppant (such as sand or ceramic) that migrate into the fractures with the fracturing fluid slurry and remain to prop open the fractures after pressure is no longer applied to the wellbore.

The pumps used in hydraulic fracturing operations may be powered by diesel engines. Recently, however, some pumps may be powered by electric motors, which can in turn be controlled by a variable frequency drive (VFD). Use of these electric motors in hydraulic fracturing pumps may not achieve smooth operation.

SUMMARY

In at least one embodiment, a system for use in fracturing operations is disclosed. The system includes an electric motor, a turbine generator, an encoderless vector control subsystem, and at least one pump. The turbine generator is adapted to generate electric power for the system. The encoderless vector control subsystem is adapted to receive the electric power from the turbine generator and to control the electric motor using determined parameters provided to the encoderless vector control subsystem. The at least one pump is adapted to receive torque input from the electric motor.

In at least one further embodiment, a method for using electric pumps in fracturing operations is also disclosed. The method includes engaging an electric motor with a turbine generator. The method also includes enabling an encoderless vector control subsystem to receive electric power from the turbine generator. The method includes a sub-process to control the electric motor using determined parameters input to the encoderless vector control subsystem. The determined parameters may be based in part on vibration induced in a feature associated with the turbine generator, such as the body of the turbine. At least one pump is engaged with the electronic motor in a further sub-process of the method so that the torque input from the electric motor may operate the at least one pump.

BRIEF DESCRIPTION OF THE DRAWINGS

The present disclosure will be readily understood upon reading the detailed description of non-limiting embodiments of the present disclosure with the accompanying drawing, in which.

DETAILED DESCRIPTION

Figure 1A:
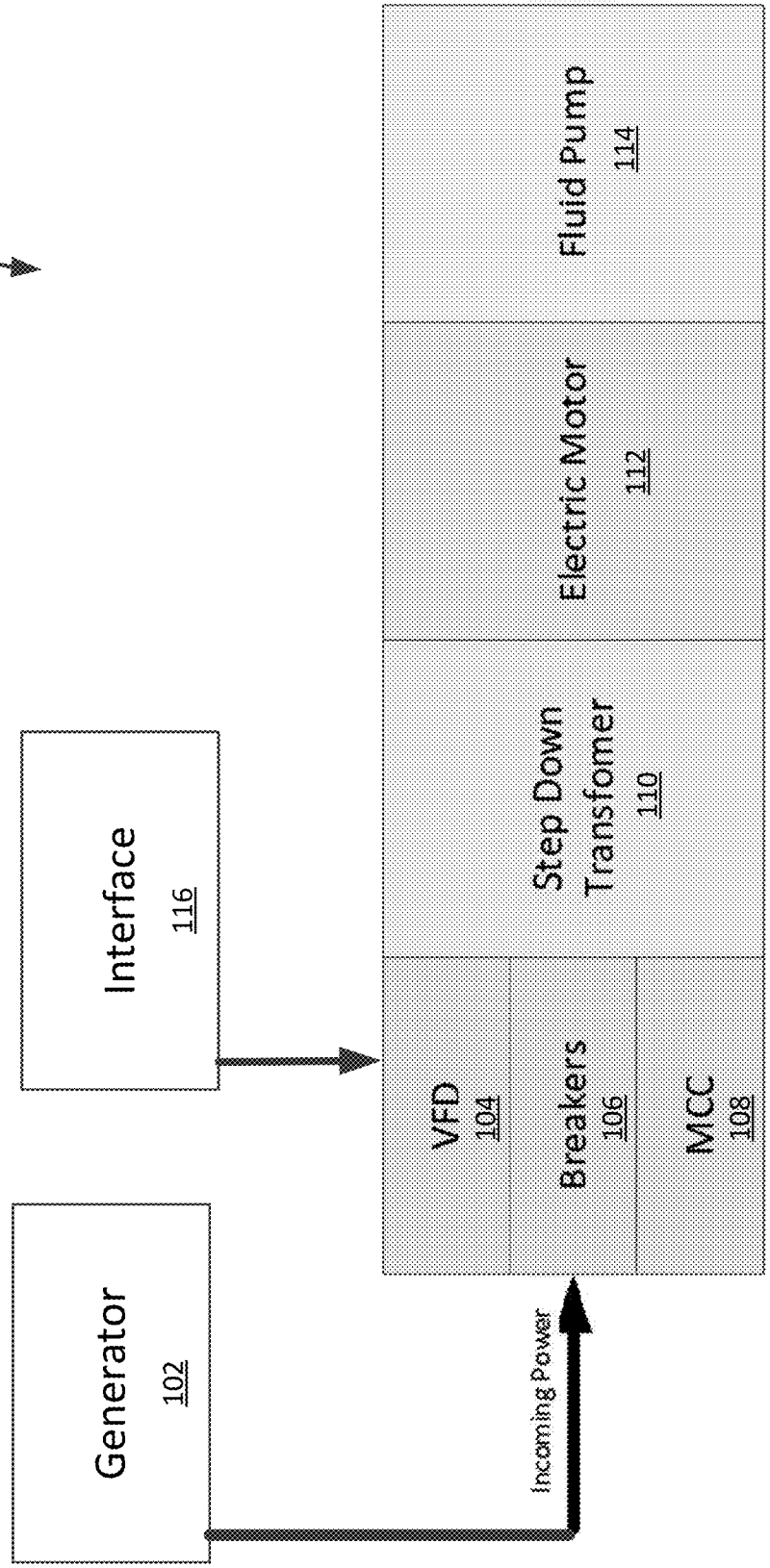
FIG. 1A is a block diagram of a system, as positioned on a trailer and used in a hydraulic fracturing operation with encoderless vector control, according to at least one embodiment of the present disclosure.

The foregoing aspects, features, and advantages of the present technology will be further appreciated when considered with reference to the following description of preferred embodiments and accompanying drawing, wherein like reference numerals represent like elements. In describing the preferred embodiments of the technology illustrated in the appended drawing, specific terminology will be used for the sake of clarity. However, the technology is not intended to be limited to the specific terms used, and it is to be understood that each specific term includes equivalents that operate in a similar manner to accomplish a similar purpose.

Non-oil and gas related applications may implement a VFD to power an electric motor in fluid applications, such as fluids having consistent properties. In an instance, the fluids may be air or clean water. However, in fracturing operations, variable loads may exist because of the inconsistency of the materials involved. A further driver of variable loads may be an unpredictable formation pressure which can vary by several thousand PSI (pounds per square inch) and the fracturing process itself, which nay require fluid rate changes throughout the process. Further, in fracturing operations, electric motors may be expected to power a high number (e.g., 10 to 20) of hydraulic fracturing pump. In addition, the present disclosure is also able to address adaptions and configurations directed to a single electric motor powering a single pump, multiple smaller electric motors powering a single pump, or a single electric motor powering two pumps. These different adaptions and configurations may be additionally challenging to the fracturing process by adding further uncertainties.

Still further, the hydraulic fracturing pumps may be driven by an electric motor that is manifolded together with common suction and discharge piping systems. As such, in addition to the inconsistencies of the fluid involved in a fracturing operation, the fluid dynamics generated as a result of the group of hydraulic fracturing pumps working together off of an electric motor may cause rough operation of the electric motor and may result in bad pump performance. For instance, discharge flow ripples may be caused by triplex, quintuplex, novemplex, and septuplex plunger pumps, which are the predominant type of pumps used in hydraulic fracturing.

Additional fluid dynamics that might disrupt smooth operation of the electric motor may be also caused during the well formation process itself. The act of fracturing and the pumped fluid, as well as returning fluid, are additional fluid dynamic effects that need addressing to enable the electric motor to perform smoothly. Other phenomena regarding the interaction of other connected equipment on the surface, in fracturing operations, can also affect a VFDs control behavior. For instance, the surface equipment's natural frequencies may be excited by the fluid dynamics or the electrical harmonics within the connected equipment.

Still further, observations are made of oscillations or vibrations in a body of a turbine portion of the turbine generator during operation of the turbine and electric motor system for hydraulic fracturing operations. In at least one embodiment, the oscillations or vibrations in the body may be more apparent in a shaft and in an associated coupler that extends or connects the turbine portion of the turbine generator to the generator portion. The oscillations or vibrations represent mechanical resonance of components of at least the turbine, but can also cause mechanical resonance in other parts of the system. The mechanical resonance at least on the shaft of the turbine generator is apparent in higher amplitude oscillations resulting from higher torque fluctuations of the shaft. This may be a result of feedback received from the load variation on electric motor. The resonance leads, eventually, to failure of at least the coupler in the turbine generator, but can also damage other parts of the system.

These and other challenges in hydraulic fracturing operations may be addressed by the present disclosure using determined parameters asserted in an encoderless vector control scheme for VFD control in an electric motor. In at least one embodiment, the encoderless vector control scheme of the present disclosure includes determining parameters suited for the electric motor that are based in part on vibrations induced in a feature associated with the turbine generator. For instance, the vibrations may be induced in a portion of the body of turbine and may be apparent on a shaft or a coupler of the turbine generator. The determined parameters may be determined based in part on monitoring oscillation alarm values representing the vibrations in features of the turbine generator that are made apparent at the shaft or the coupler, among other end features of the system. In at least one embodiment, the vibrations are monitored on one or more body portions of the turbine part of the turbine generator.

Figure 5:
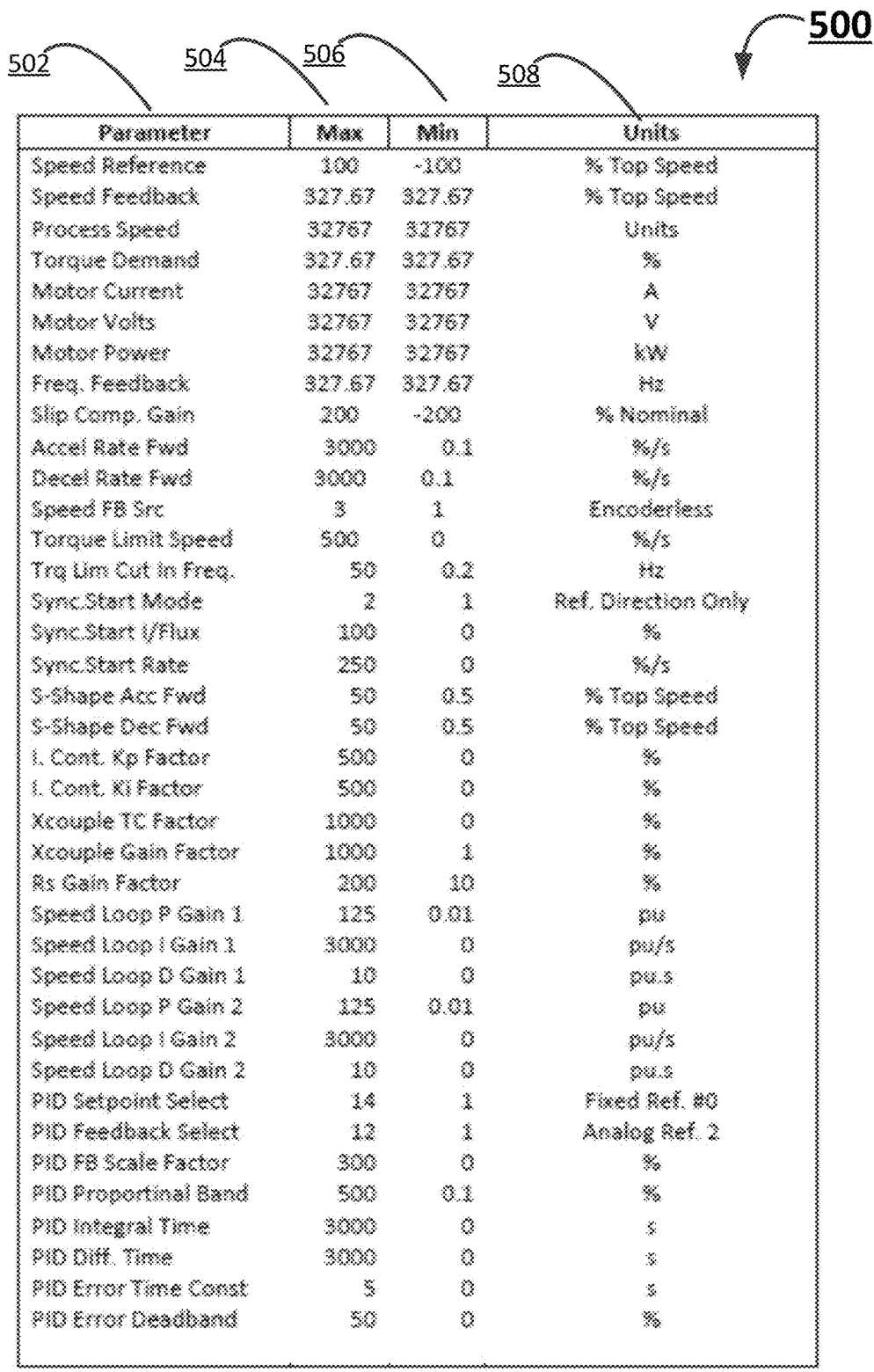
FIG. 5 illustrates select determined parameters and associated values within the encoderless vector control for a VFD used in hydraulic fracturing operations, according to at least one embodiment of the present disclosure.

As such, in at least one embodiment, the oscillation alarm values represent vibration in at least one part of the system for a period of time. The oscillation alarm values may be within a range of about 15 to about 45 upon engagement of the motor with a load for the period of time. In at least one embodiment, the encoderless vector control scheme includes determining parameters suited for the electric motor based in part on the oscillation alarm values being at least less than about 70 upon engagement of the motor with a load. In at least one embodiment, the determined parameters for the encoderless vector control subsystem are selected from at least speed values, motor values, and proportional-integral-derivative (PID) control values, among other values listed in Appendix A (referencing table 1) of the present disclosure under minimum and maximum values that may work to reduce the oscillation alarm values with the encoderless vector control scheme applied to the hydraulic fracturing system. As such, Appendix A is incorporated by reference herein to illustrate other parameters that may be used to form the determined parameters, as well as their associated range of values available to enable the encoderless vector control subsystem of the present disclosure. FIG. 5 provides example predetermined parameters from Appendix A, and their associated range of values to enable an embodiment of the encoderless vector control subsystem of the present disclosure.

Encoderless vector control schemes for VFDs are provided herein to support smooth operation in high-performance electric motor over an entire speed range, to enable capability of the electric motor to generate full torque at zero speed, to improve high dynamic performance for the electric motor, and to support fast acceleration and deceleration in the electric motor. The present disclosure adapts such requirements to the benefit of hydraulic fracturing operations. In at least one embodiment, vector control in an encoderless vector control subsystem refers to a control method for electric motors via the VFD, for instance, in which certain motor input components may be referenced by its vector. The vectors may include complex current or voltage values, for instance. In at least one embodiment, reference to encoderless is made in the encoderless vector control subsystem to indicate that the determined parameters are predetermined by at least an estimation conducted, such as in a testing environment using available parameters in the system to maintain vibrations below a threshold. In at least one embodiment, the vibrations may be measured using the oscillation alarms and the thresholds set using the oscillation alarms.

FIG. 1A is a block diagram of system 100 that is positioned on a trailer and used in a hydraulic fracturing operation with encoderless vector control, according to at least one embodiment of the present disclosure. As such, the layout in FIG. 1A reflects how the system components may be positioned but not necessarily the flow of electric current or power, for instance, which is other described elsewhere throughout this description. The system 100 includes one or more generators 102 for generating power for an electric motor 112. The one or more generators may include a natural gas-powered generator. In at least one embodiment, the one or more generators may include a turbine generator. The system 100 also includes a pump, such as a fluid pump 114, to perform the hydraulic fracturing operation; a variable frequency drive (VFD) 104 for controlling the electric motor; breakers 106 to handle overloads and overdraw situations; and a motor control center (MCC) 108 for control of electrical sub-systems, including blower motors, coolant pumps, lube oil pumps, lighting, heaters, control power, receptacles, and fan motors.

In at least one embodiment, the pump 114 is configured for pumping the hydraulic fracturing fluid into a well and the associated formation. In addition, the pump 114 is adapted or configured for high pressure pumping so as to enable fracturing of the formation. The electric motor 112 may be coupled to the electric pump 114 via a high-strength steel or steel alloy shaft. One or more of these system components may be housed on main or auxiliary trailers so that they remain mobile.

In at least one embodiment, the MCC 108 may support the breakers 106 by a monitoring action. The breakers 106 support distribution of power from the generators to components of varied load requirements. In at least one embodiment, the components may be other than the system components, and may be equipment used at a wellsite, include lights, heaters, blowers, small pumps, control computers, and motors. Shorts or high draws from a load asserted through one or more of the breakers may cause the breakers 106 to trip for protection.

In at least one embodiment, a transformer 110 may be located on one or more trailer after the VFD 104 and prior to the electric motor 112, which may be on the same or different trailers. However, the location of the components on one or more trailers has no effect on the flow of current or power which is described separately. For instance, the generator generates electricity that may be input to VFD 104 through breakers, if needed, irrespective of the location of these components. Cables may be used to connect the various components irrespective of their locations on or off one or more trailers. As the generator 102 may support other components requiring power then the electric motor 112, the generator 102 may provide the required voltage via MCC 108. The transformer 110 steps down the voltage provided from the generator 102, for the VFD 104, the MCC 108, and the electric motor 112 to a manageable voltage handled by these components. The electric motor 112 drives the electric pump 114 to perform the requisite fracturing operations. In at least one embodiment, the electric motor 112 may be an induction motor or a permanent magnet motor.

In at least one embodiment, interface 116 may be used to provide the determined parameters to the VFD 104 or another component having at least a memory having instructions and a processor for executing the instructions to perform functions. In at least one embodiment, the memory may also store the determined parameters. In at least one embodiment, the functions include distributing the determined parameters to various system components for setting the system components according to the determined parameters.

Figure 1B:
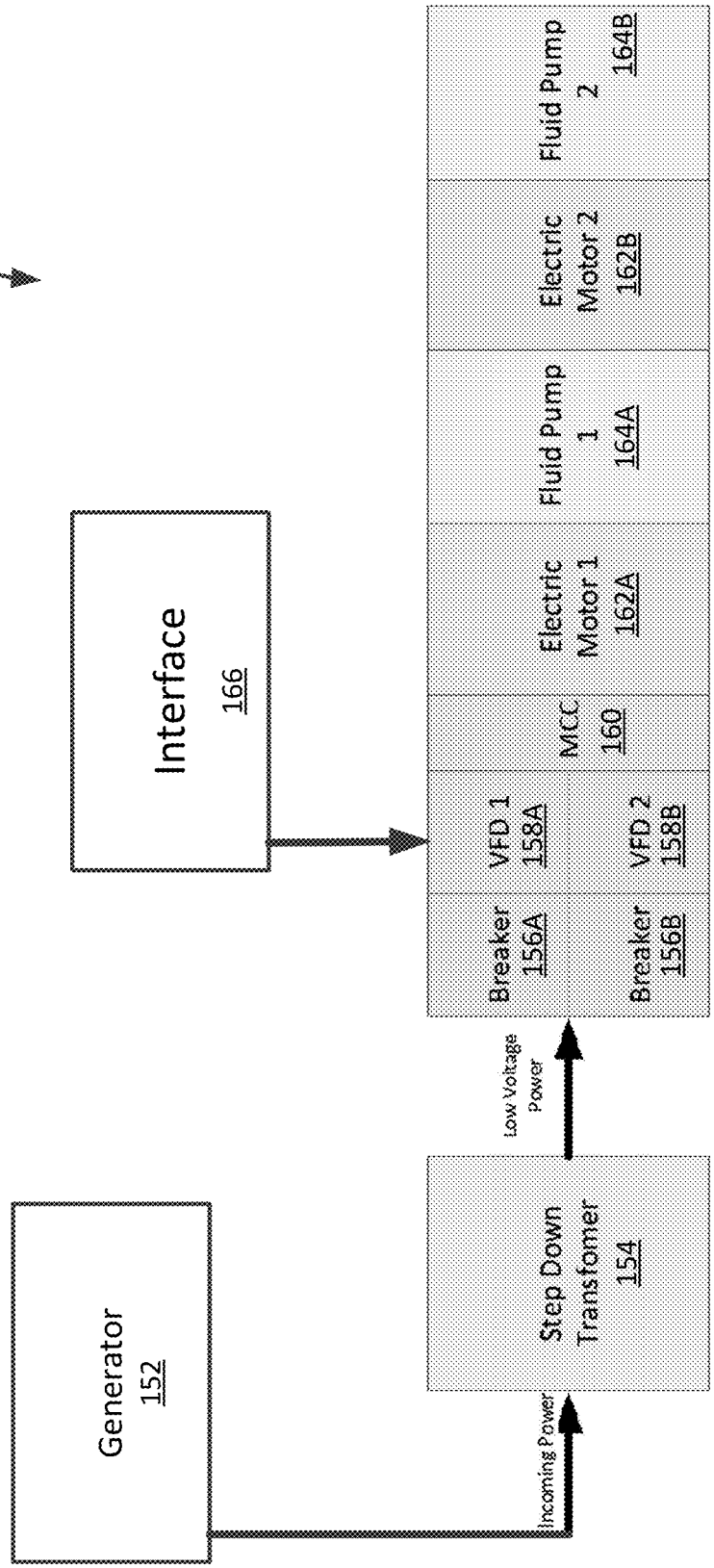
FIG. 1B is another block diagram of a system, as positioned on a trailer and used in a hydraulic fracturing operation with encoderless vector control, according to at least one embodiment of the present disclosure.

FIG. 1B is another block diagram of a system 150 that is positioned on a trailer and used in a hydraulic fracturing operation with encoderless vector control, according to at least one embodiment of the present disclosure. As such and as in the case of FIG. 1, the layout in FIG. 1B reflects how the system components may be positioned, but not necessarily the flow of current or power, which is described elsewhere throughout this description otherwise. In at least one embodiment, as in the system 100, the system 200 of FIG. 1B includes one or more generators 152 for generating power for one or more electric motors 162A, B. The one or more generators 152 may include a natural gas-powered generator. In at least one embodiment, the one or more generators 152 may include a turbine generator. The system 150 also includes one or more pumps, such as a fluid pumps 164A, B, to perform the hydraulic fracturing operation; one or more variable frequency drives (VFDs) 158A, B for controlling the respective electric motors 162A, B; breakers 156A, B to handle respective overloads and overdraw situations associated with a respective electric motor 162A, B; and a motor control center (MCC) 168 for control of electrical sub-systems, including blower motors, coolant pumps, lube oil pumps, lighting, heaters, control power, receptacles, and fan motors.

In at least one embodiment, the pumps 164A, B are individually configured for pumping the hydraulic fracturing fluid into a well. In at least one embodiment, the pumps draw slurry, representing the fracturing fluid, from the blender at a low pressure, boost the slurry to a high pressure for application into the well that connected to the formation. In addition, the pumps 164A, B are individually adapted or configured for high pressure pumping so as to enable cracking of the formation. Furthermore, each electric motor 162A; 162B may be coupled to one or more pumps 164A, B, but each electric motor 162A; 162B may be couple to individual ones of the one or more pumps 164A, 164B. Each electric motor 162A, B may be coupled to the one or more electric pumps 164A, B via a high-strength steel or steel alloy shaft. One or more of these system components may be housed on main or auxiliary trailers so that they remain mobile.

In at least one embodiment, the MCC 160 may support the breakers 156A, B by a monitoring action. The breakers 156A, B support distribution of power from the generator(s) 152 to components of varied load requirements. In at least one embodiment, the components may be other than the system components, and may be equipment used at a wellsite, include lights, heaters, blowers, small pumps, control computers, and motors. Shorts or high draws from a load asserted through one or more of the breakers may cause the breakers 156A, B to trip for protection.

In at least one embodiment of FIG. 1B distinct from the system 100 of FIG. 1A, the transformer 154 may be located on one or more trailers after the generator 102 and prior to the breakers 156A, B or even the VFDs 158A, B, which may be on the same or different trailers. However, the location of the components on one or more trailers has no effect on the flow of current or power which is described separately. For instance, the generator generates electricity that passes through breakers 156A, B and to VFDs 158A, B. As the generator(s) 152 may support other components than illustrated that also require power, the generator 152 may be a high voltage generator. The transformer 154, therefore, steps down the voltage to a manageable voltage handled by the VFD 158A, B, and as required by components coupled to the MCC 160. In at least one embodiment, the electric motor 162A, B may be an induction motor or a permanent magnet motor, as in the system 100 of FIG. 1A.

Furthermore, applying an encoderless vector control scheme within the VFD in the present systems 100; 150 may not solve every one of the above-described problems, but focusing on certain parameters or many (e.g., thousands) of parameters available for control of the system allows for resolution of at least the vibrations, oscillations, or resonance associated with the turbine, the shaft, and/or coupler. In at least one embodiment, determined parameters from the available system parameters are adjusted and set for the application in any given situation, such as before a load is engaged with the system 100; 150. While each component, such as the electric motors 112; 162A, B, or the turbines 102; 152 have ratings or default parameters, these are not defined to the requirements of a hydraulic fracturing system.

In at least one embodiment, a vibration sensor is used with the system 100; 150, for example, at the turbine 102; 152 to determine parameters from the available parameters of the systems' components. In at least one embodiment, the determined parameters are coded into the VFD prior to engaging the electric motor with the respective electric pump. In at least one embodiment, the assertion of the determined parameters for of the VFD may override the default settings for the systems' components. The determined parameters have a range of settings that are, therefore, enable proper tuning of the electric motor for the hydraulic fracturing application, to obtain desired motor control behaviors. The tuned set of parameters described in concurrently submitted Appendix A forms part of this disclosure and may be selected based in part on monitoring vibration from various points of the turbine.

In at least one embodiment, the encoderless vector control scheme utilizes parameters associated with respective VFDs to enable an electric motor to drive a hydraulic fracturing pump smoothly over the motor's entire speed range, to generate full torque at zero speed, and to have high dynamic performance, including fast acceleration and deceleration of the hydraulic fracturing pumps. Also, natural frequencies present in the connected equipment may be isolated by the VFD having the determined parameters, and any excitement previously in the system 100; 150 may be limited after adopting encoderless vector control scheme as demonstrated by the discussion in at least FIG. 4, where specific tuned parameters or determined parameters were applied after monitoring effects of the vibration at the turbine. The determined parameters are not excited or affected during operation of the system 100; 150 after adopting encoderless vector control.

In at least one embodiment, interface 166, as in the case of the embodiment in FIG. 1A may be used to provide the determined parameters to the VFD 158A, B or another component having at least a memory having instructions and a processor for executing the instructions to perform functions. In at least one embodiment, the memory may also store the determined parameters. In at least one embodiment, the functions include distributing the determined parameters to various system components for setting the system components according to the determined parameters.

Figure 1C:
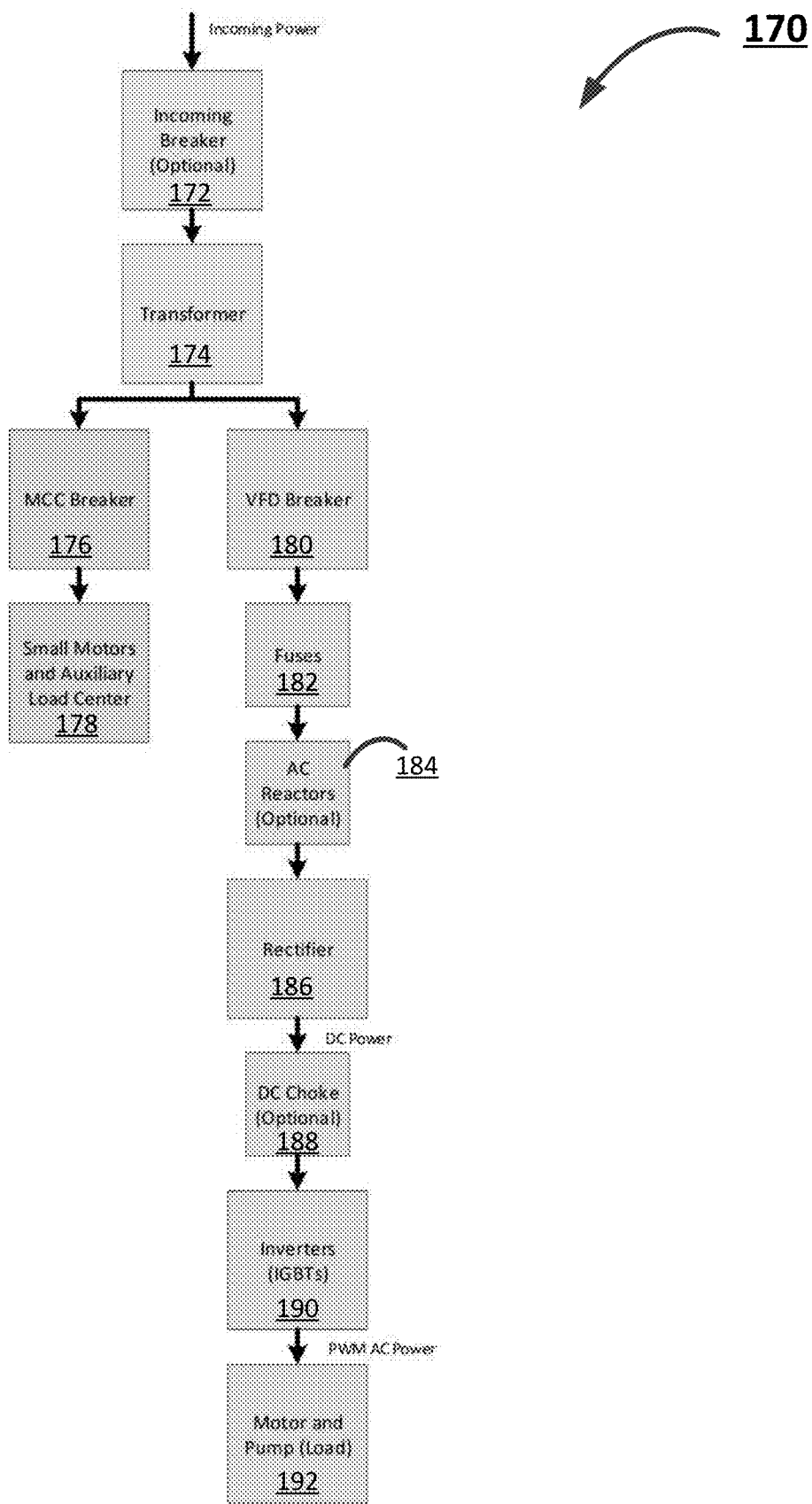
FIG. 1C is another block diagram of a system, as positioned on a trailer and used in a hydraulic fracturing operation with encoderless vector control, according to at least one embodiment of the present disclosure.

FIG. 1C is another block diagram of a system 170, as positioned on a trailer and used in a hydraulic fracturing operation with encoderless vector control, according to at least one embodiment of the present disclosure. Incoming power, from a generator, for instance, may pass through an incoming breaker 172. The incoming breaker 172 is optional as noted. A transformer 174 steps down the voltage of the income power from the generator. The transformer may feed one or more components. As illustrated, a further breaker in the form of an MCC breaker 176 enables power from the transformer to reach auxiliary components 178. These components 178 include one or more small motors and an auxiliary load center. The transformer may separately or concurrently feed a VFD through VFD breakers 180 and fuses 182. One or more of these breakers and fuse may be optional. The VFD is illustrated as one or more of components 184-190. The VFD may include an alternating current (AC) reactor 184, a rectifier 186, a direct current (DC) choke 188, and one or more inverters 190 that may be an IGBT (insulated-gate bipolar transistor)-type inverter. The rectifier 186 enables conversion of the AC to the DC power, which the inverters 190 then convert to pulse-width-modulated (PWM) AC power. The PWM AC power is used to power the electric pump or motor 192. FIG. 1C also illustrates that parameters from FIG. 5 (or Appendix A) may relate to one or more of the components in FIG. 1C and applied values for the parameters may adapt the operations of one or more of the components in FIG. 1C to reduce vibrations in at least the turbine features discussed with respect to at least FIG. 2.

Figure 2:
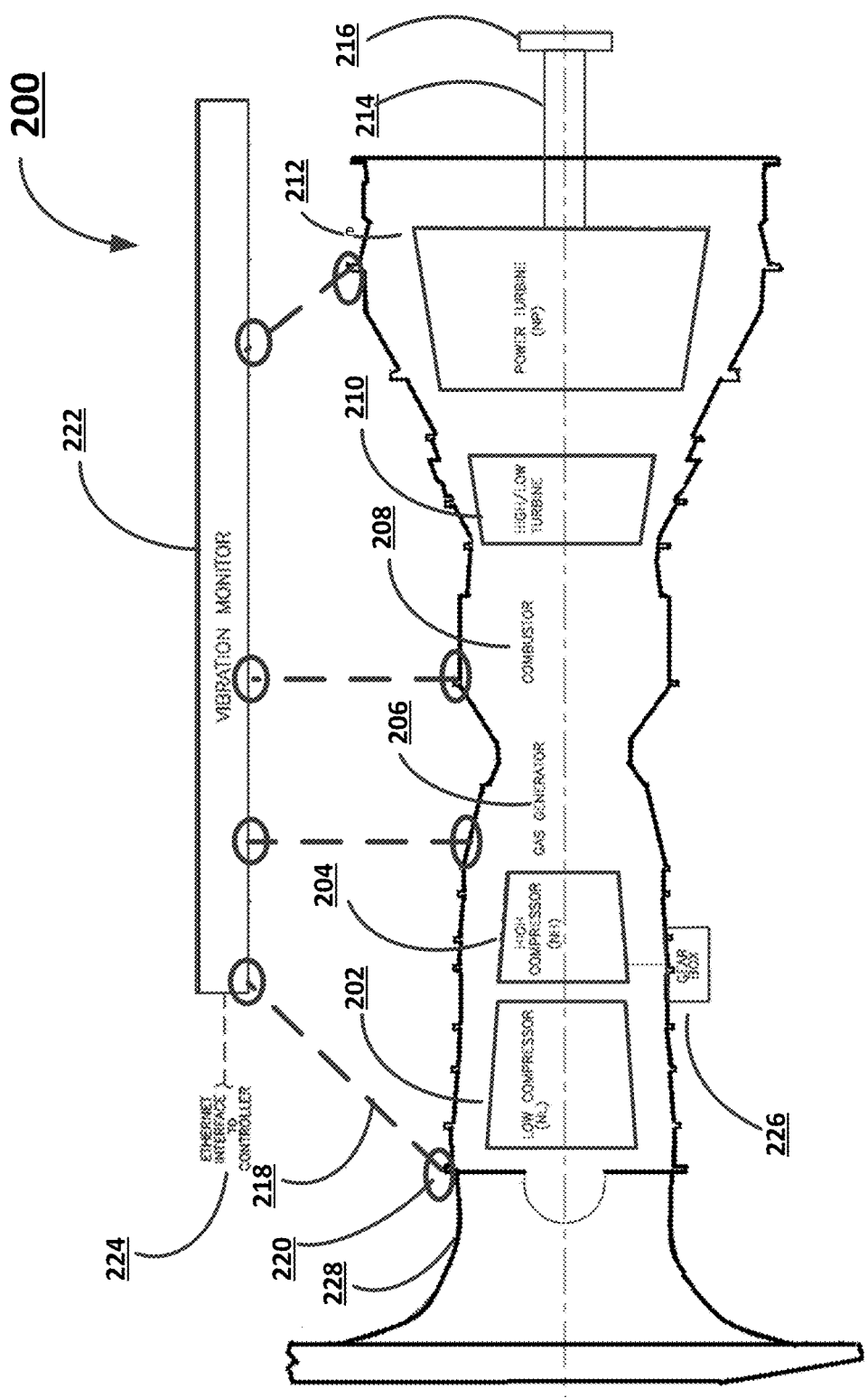
FIG. 2 is a section diagram of a turbine within a system used in a hydraulic fracturing operation and benefiting from encoderless vector control, according to at least one embodiment of the present disclosure.

FIG. 2 is a section diagram of a turbine 200 within a system used in a hydraulic fracturing operation and benefiting from encoderless vector control, according to at least one embodiment of the present disclosure. The turbine 200 includes low compressor section 202, a high compressor section 204, a gas generator section 206, a combustor section 208, a high/low turbine section 210, a power turbine section 212, and a gear box 228 for the high compressor section 204. A shaft 214, along with a coupler 216, translates the generated rotational motion to a generator to provide the electricity requirements for the electric motor.

In at least one embodiment, the turbine 200 is associated with one or more vibration monitors 222, which receive or monitor vibration at one or more sensors 220 (one is marked for reference) at one or more locations throughout the turbine 200. The locations may be on the body 228 adjacent to a section 202-212 within the body or may be directly within the sections. In at least one embodiment, physical connectors (represented in the example by reference numeral 218) carry signals from the one or more sensors 222 to the monitor(s) 220. In at least one embodiment, the vibrations monitored at the one or more locations are apparent on the shaft 214 and/or coupler 216, and may result in damage to the coupler. As such, even though no sensor is provided at the coupler, the monitor 220 provides sufficient information via Ethernet interface 224, for instance, to enable the determine parameters that may be asserted for an encoderless vector control scheme of the present disclosure. In at least one embodiment, FIG. 5 provides examples of determined parameters that may be used in the encoderless vector control scheme.

In at least one embodiment, the monitor 220 provides information pertaining to the oscillation alarms via Ethernet interface 224, for applied determined parameters of the system. The applied determined parameters are qualified for use with a similar application, under a similar configuration, as the determined parameters for the VFD to ensure that the vibrations are the least possible, as reflected by the oscillation alarms being reduced in reference to at least FIG. 4.

Figure 3:
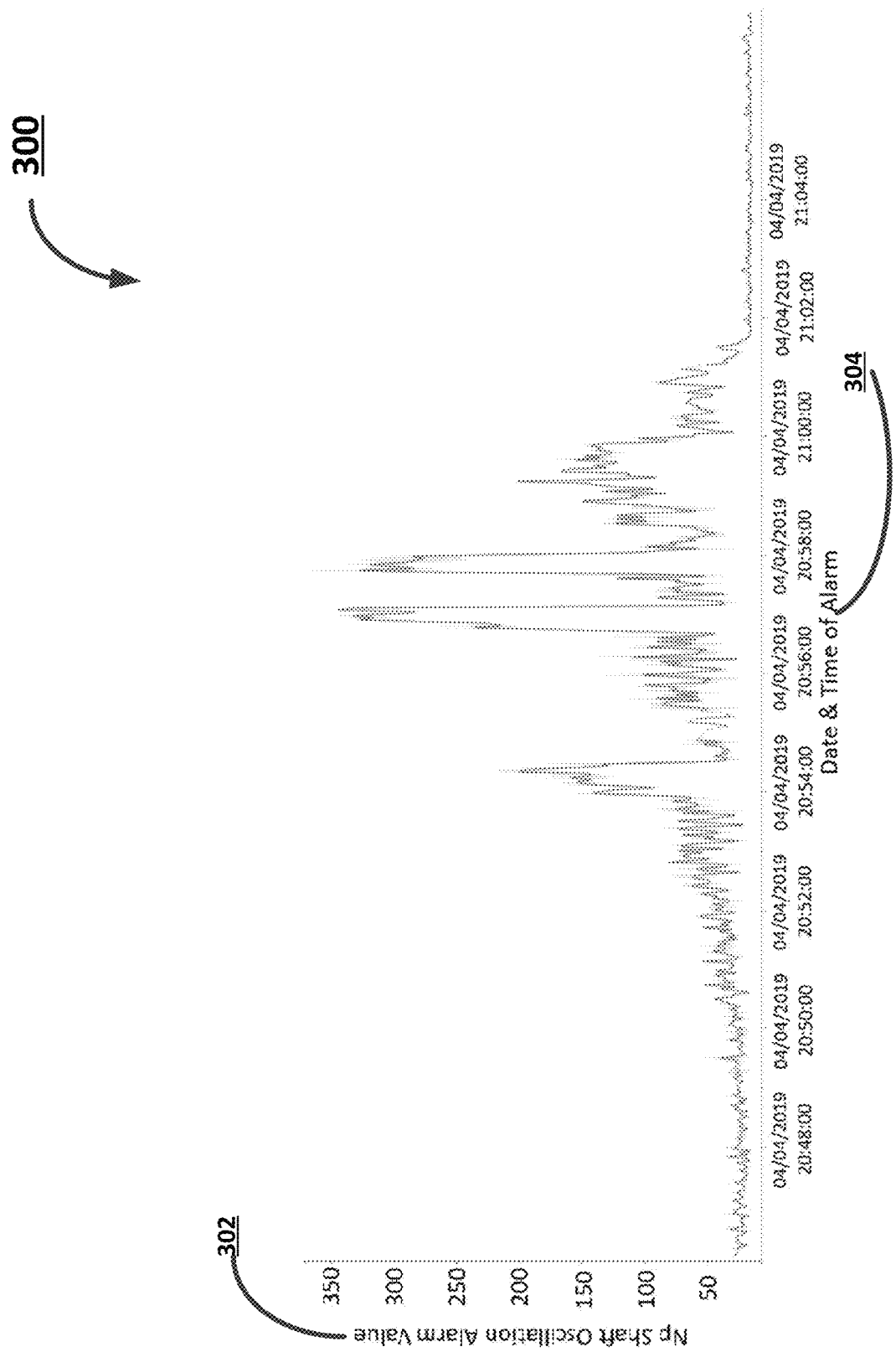
FIG. 3 is graph illustrating system vibration and instability of a system for hydraulic fracturing that may benefit from aspects of the present disclosure.

FIG. 3 is graph 300 illustrating system vibration and instability of a system for hydraulic fracturing that may benefit from aspects of the present disclosure. The y-axis 302 represents Number of Shaft Oscillation Alarm Values and the x-axis 304 represents Date and Time of Alarm, when an oscillation alarm occurs. In at least one embodiment, the oscillation alarm represents a monitored vibration beyond an acceptable vibration set within the monitor 220 of FIG. 2 for each of the one or more locations referenced in FIG. 2. Further, the oscillation alarm represents, in at least one embodiment, vibration that is associated with at least one turbine of a hydraulic fracturing system that may include one or more turbines, generators, or turbine generators.

The graph 300 in FIG. 3 illustrates system vibration and instability prior to implementation of an encoderless vector control scheme. In at least one embodiment, the graph represents the number of oscillation alarms received when the system is in operation over different dates and times as noted in the x-axis of the graph.

As illustrated, further, the instability is pertinently represented by a non-uniform scope of the oscillation alarms. In at least one embodiment, the vertical scale is a dimensionless value or number that is proportional to vibration (rpm/sec) for a portion or at least a feature of the equipment. In at least one embodiment, the feature is on the surface during pumping operations and the value or number may indicate a natural frequency of an excited system under operation. As illustrated the peak of the values in graph 300 approaches 350. A desired value is however lower, for instance, at around 20. At the lower value, instability is reduced or halted when pumping operations are ongoing, but in graph 300, the lower values are obtained only when pumping operations is significantly slowed, which is not desirable during hydraulic fracturing operations.

Figure 4:
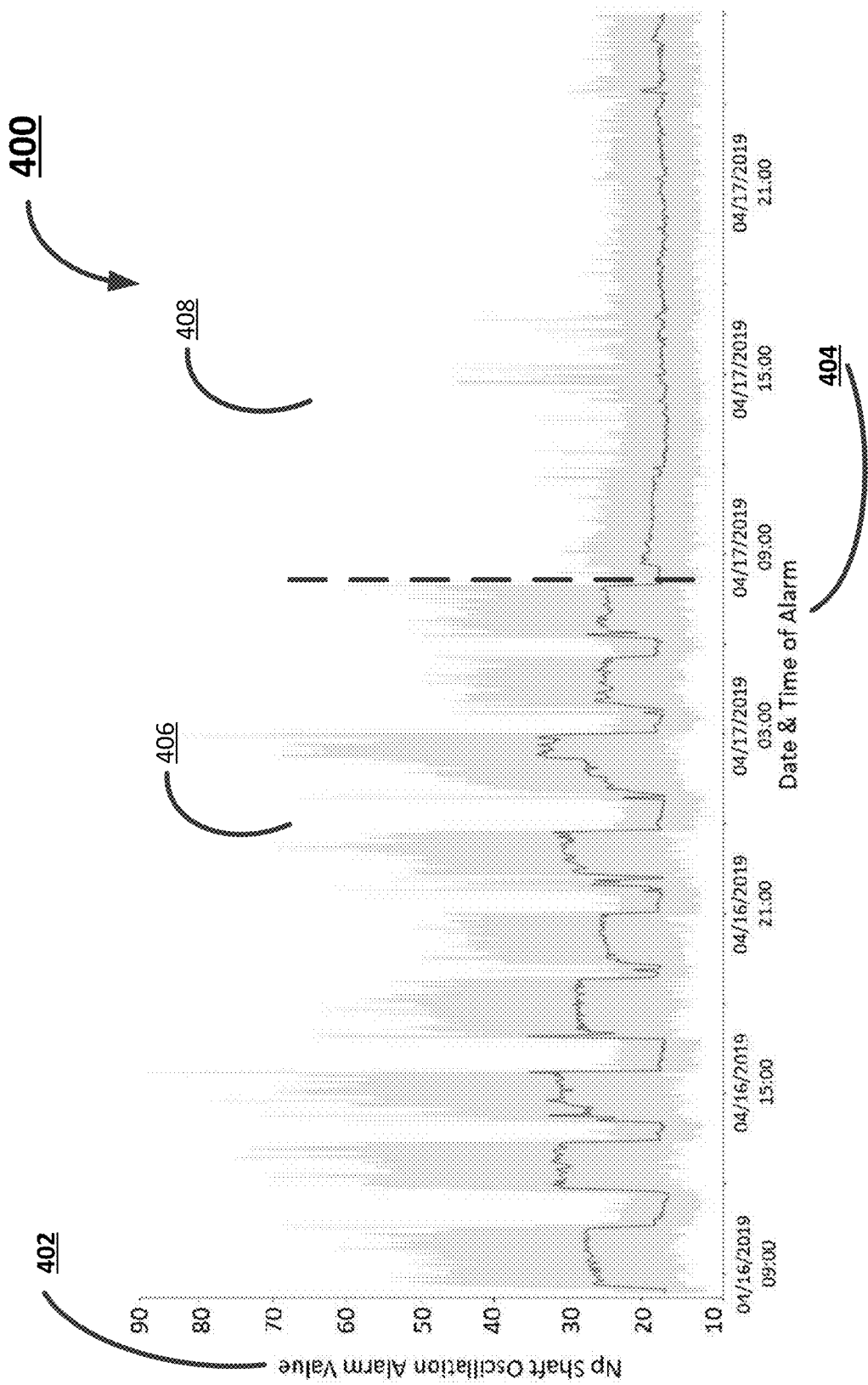
FIG. 4 is a graph illustrating reduced system vibration and increased stability for a system for hydraulic fracturing that implements aspects of the present disclosure.

FIG. 4 is a graph 400 illustrating reduced system vibration and increased stability for a system for hydraulic fracturing that implements aspects of the present disclosure. In at least one embodiment, FIG. 4 illustrates a graph 400 having reduced system vibration and increased stability after implementation of an encoderless vector control scheme. Pertinently, however, even though the scale and dimensions on the x and the y-axes 402, 404 are similar to those of FIG. 3. The left side 406 of the graph 400 represents vibrations present at one or more of the monitored locations referenced in FIG. 2, but with some order, during each individual hydraulic fracturing stage, prior to encoderless vector control being implemented. The right side 408 of the graph 400, on the other hand, represents reduced vibrations monitored at the one or more locations referenced in FIG. 2, after implementation of the encoderless vector control scheme.

In at least one embodiment, the oscillation alarm values in the right side 408 of the graph 400 represent vibration in at least one part of the system for a period of time and may be within a range of about 15 to about 45 upon engagement of the motor with a load for the period of time. In at least one embodiment, the encoderless vector control scheme includes determining parameters suited for the electric motor based in part on the oscillation alarm values being at least less than about 45 or less than about 70 upon engagement of the motor with a load. These values are represented as attainable by the monitoring system indicating graph points within these values on the right side 408 of the graph 400.

FIG. 5 illustrates a table 500 of select determined parameters 502 and corresponding values 504, 506, with units 508, within the encoderless vector control for a VFD used in hydraulic fracturing operations, according to at least one embodiment of the present disclosure. Selected determined parameters 502 represent example parameters that may be tuned or adjusted for the encoderless vector control, at least as input for the VFD. The example parameters include example maximum and minimum values 504, 506, and their units 508. Table 1, in concurrently filed Appendix A, includes a set of further possible encoderless vector control determined parameters and some of the ranges of values that can be implemented for a fracturing pump VFD.

The VFD encoderless vector control system of the present disclosure enable the electric motor to drive a hydraulic fracturing pump in a smooth operating curve over the motor's entire speed range, to generate full torque at zero speed, and to have high dynamic performance, including fast acceleration and deceleration of the fracturing pump. Also, natural frequencies that were present within the connected equipment, and prone to excitation prior to adopting encoderless vector control and the specific tuned parameters, were not prone to excitation after adopting encoderless vector control and tuned parameters.

Figure 6:
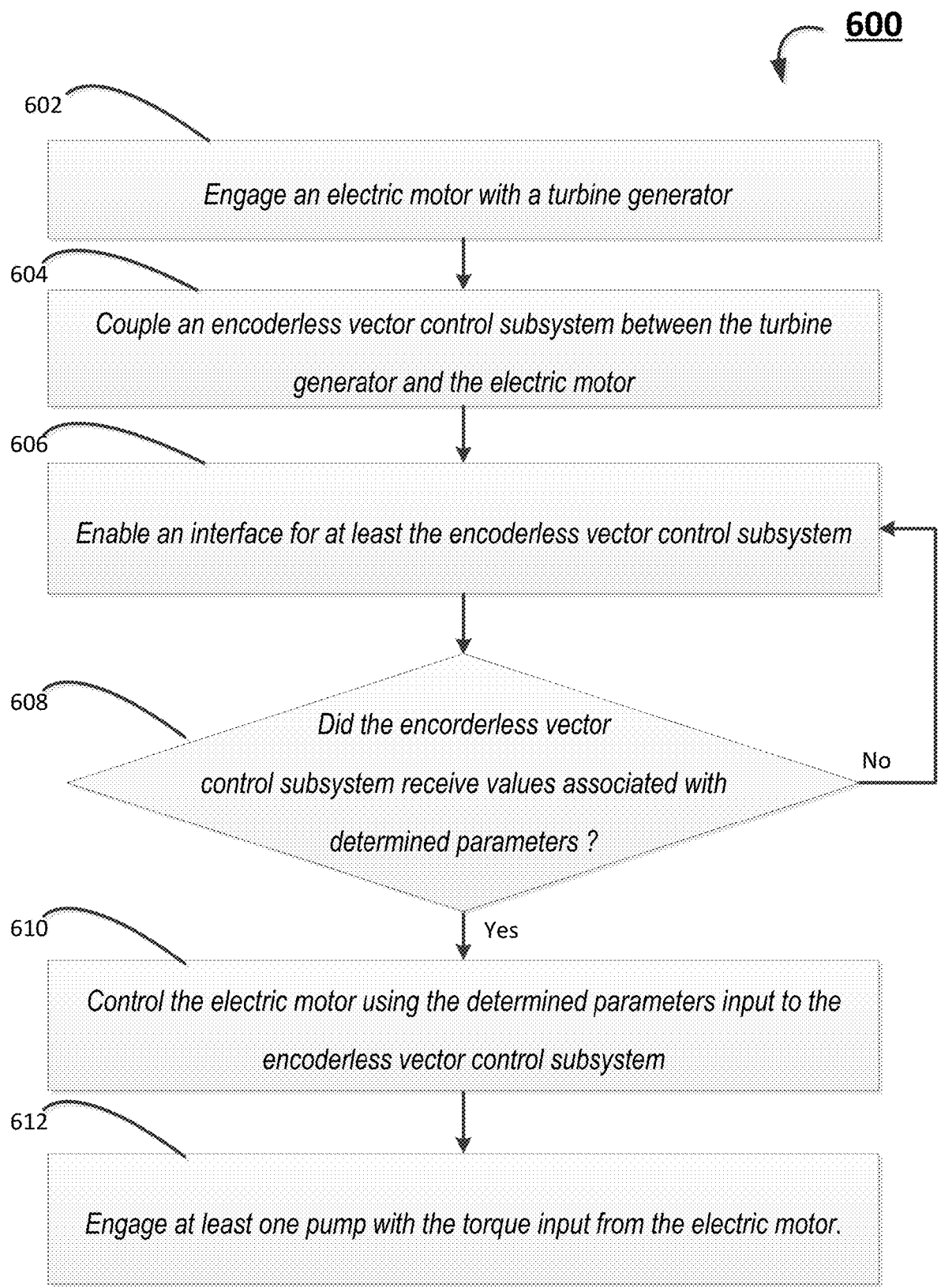
FIG. 6 illustrates a flowchart of a method for encoderless vector control for a VFD used in fracturing operations, according to at least one embodiment of the present disclosure.

FIG. 6 illustrates a flowchart 600 of a method for encoderless vector control for a VFD used in fracturing operations, according to at least one embodiment of the present disclosure. In at least one sub-process 602, an electric motor is engaged with a turbine generator; to receive electric supply indirectly from the turbine generator, for instance. The engagement includes electrical coupling and/or mechanical coupling to associate these two system components together for a fracturing operation. Alternatively, sub-process 602 prepares the turbine generator to generate power by following the required starting and regulating protocols for the turbine generator, for instance. Sub-process 604 couples an encoderless vector control subsystem, such as an encoderless vector control VFD, between the electric motor and the turbine generator. Additional components including breakers and/or transformers may be required and may be recognized and implemented from the disclosure herein, but may be omitted for discussion of FIG. 6.

In at least one embodiment, sub-process 606 enables an interface to receive the determined parameters for the subsystem. In at least one embodiment, the encoderless vector control subsystem includes at least the VFD. The values may be loaded by an executable program or code provided to a machine interface of the VFD or to a component connected to the VFD. As such, the VFD may include or be associated with a processor and a memory including instructions executable by the processor to perform functions for the encoderless vector control subsystem. In at least one embodiment, the functions enable settings for one or more system components of the fracturing system. For instance, speed reference (vales from FIG. 5), motor current, and motor voltage may be all provided from a computer functioning as an interface (e.g., interfaces 116, 166 of FIGS. 1A, 1B), external to the VFD or the system.

Sub-process 608 determines if the encoderless vector control subsystem received values associated with the determined parameters. In at least one embodiment, sub-process 608 may use values from a prior application of the encoderless vector control subsystem to achieve stable operation of the system. Alternatively, sub-process 608 may be applied in a test environment using the vibration sensors and using the monitors previously referenced, prior to method 600 being applied in a real-time environment using the determined parameters from the test environment.

In at least one embodiment, when the determined parameters are available, sub-process 610 controls the electric motor using the determined parameters input to the encoderless vector control subsystem that may include the VFD and may include one or more additional component capable of providing settings for one or more system components of an encoderless vector control system for hydraulic fracturing. Sub-process 612 engages at least one pump with torque input provided from the electric motor when the fracturing operation is performed. Sub-process 606 for the interface remains available for updates to the determined parameters or to override the determined parameters previously provided, for instance.

In at least one embodiment, the system discussed herein for implementing aspects in accordance with various embodiments are computer-based environments having hardware and software capabilities. For instance, a computer-based environment may include human-machine interfaces, processors, memory components, and communication components for receiving input from external computers. Further, different computing environments may be used, as appropriate, to implement various embodiments. External computers may be used to interact with various embodiments and can include any appropriate device operable to send and receive requests, messages, or information over an appropriate network and convey information back to a user of the device. Examples of such external computers may include personal computers, smart phones, handheld messaging devices, laptop computers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof using communication component, such as discussed throughout this disclosure.

While the technology has been shown or described in only some of its forms, it should be apparent to those skilled in the art that it is not so limited, but is susceptible to various changes without departing from the scope of the technology. Furthermore, it is to be understood that the above disclosed embodiments are merely illustrative of the principles and applications of the present technology. Accordingly, numerous modifications can be made to the illustrative embodiments and other arrangements can be devised without departing from the spirit and scope of the present technology as defined by the appended claims.

What is claimed is:

1. A system for use in fracturing operations, the system comprising:
    an electric motor;
    a turbine generator to generate electric power;
    an encoderless vector control subsystem to receive the electric power from the turbine generator and to control the electric motor using determined parameters provided to the encoderless vector control subsystem, wherein the determined parameters represent vibration in at least a portion of a body associated with the turbine generator, for a period of time and that is measured by monitoring oscillation alarm values; and
    at least one pump to receive torque input from the electric motor.

2. The system of claim 1, further comprising:
    a vibration sensor for monitoring the vibration induced in a feature associated with a turbine of the turbine generator and providing input for the determined parameters based in part on the vibration.

3. The system of claim 1, further comprising:
    the vibration sensor associated with the body of the turbine generator for monitoring the vibration induced in the body of the turbine of the turbine generator, in part, due to a feedback resonance received to the turbine.

4. The system of claim 1, further comprising:
    an encoderless variable frequency drive (VFD) functioning as the encoderless vector control subsystem.

5. The system of claim 1, further comprising:
    a machine interface to receive the determined parameters for the encoderless vector control subsystem; and
    at least one processor to apply the determined parameters to the electric motor prior to engagement of a load with the electric motor.

6. The system of claim 1, wherein the determined parameters for the encoderless vector control subsystem are determined based in part on the oscillation alarm values for the vibration that occurs over a period of time and within a predetermined range of the oscillation alarm values, upon engagement of the motor with a load.

7. The system of claim 1, wherein the determined parameters for the encoderless vector control subsystem are determined based in part on the oscillation alarm values for the vibration that occurs over a period of time and within a predetermined number of the oscillation alarm values, upon engagement of the motor with a load.

8. The system of claim 1, wherein the determined parameters for the encoderless vector control subsystem are selected from at least speed values, motor values, and proportional-integral-derivative (PID) control values.

9. The system of claim 1, further comprising:
    one or more triplex, quintuplex, novemplex, or septuplex plunger pumps adapted to receive the torque input from the electric motor.

10. A method for using electric pumps in fracturing operations comprising:
    engaging an electric motor with a turbine generator;
    enabling an encoderless vector control subsystem to receive electric power from the turbine generator;
    controlling the electric motor using determined parameters input to the encoderless vector control subsystem, wherein the determined parameters represent vibration in at least a portion of a body associated with the turbine generator, for a period of time and that is measured by monitoring oscillation alarm values; and
    engaging at least one pump with the torque input from the electric motor.

11. The method of claim 10, wherein the determined parameters are based in part on the vibration induced in a feature associated with the turbine generator.

12. The method of claim 11, further comprising:
    monitoring the vibration induced in the body of a turbine associated with the turbine generator, the determined parameters based in part on the vibration induced in the body, in part, due to a feedback resonance received to the turbine generator.

13. The method of claim 10, further comprising:
    using an encoderless variable frequency drive (VFD) as the encoderless vector control subsystem.

14. The method of claim 10, further comprising:
    enabling a machine interface to receive the determined parameters for the encoderless vector control subsystem; and
    applying, using at least one processor, the determined parameters to the electric motor prior to engagement of a load with the electric motor.

15. The method of claim 10, wherein the determined parameters for the encoderless vector control subsystem are determined based in part on the oscillation alarm values for the vibration that is over a period of time and within a predetermined range of the oscillation alarm values, upon engagement of the motor with a load.

16. The method of claim 10, wherein the determined parameters for the encoderless vector control subsystem are determined based in part on the oscillation alarm values for the vibration that occurs over a period of time and within a predetermined number of the oscillation alarm values, upon engagement of the motor with a load.

17. The method of claim 10, wherein the determined parameters for the encoderless vector control subsystem are selected from at least speed values, motor values, and proportional-integral-derivative (PID) control values.

18. The method of claim 10, further comprising:
engaging one or more triplex, quintuplex, novemplex, or septuplex plunger pumps with the electric motor to receive the torque out from the electric motor.

* * * * *